US012167000B2

(12) United States Patent
Bampis et al.

(10) Patent No.: US 12,167,000 B2
(45) Date of Patent: Dec. 10, 2024

(54) TECHNIQUES FOR PREDICTING VIDEO QUALITY ACROSS DIFFERENT VIEWING PARAMETERS

(71) Applicant: NETFLIX, INC., Los Gatos, CA (US)

(72) Inventors: Christos G. Bampis, Los Gatos, CA (US); Zhi Li, Mountain View, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 17/937,033

(22) Filed: Sep. 30, 2022

(65) Prior Publication Data

US 2024/0121402 A1   Apr. 11, 2024

(51) Int. Cl.
| | |
|---|---|
| *H04N 19/154* | (2014.01) |
| *H04N 19/136* | (2014.01) |
| *H04N 19/172* | (2014.01) |
| *H04N 19/182* | (2014.01) |
| *H04N 19/184* | (2014.01) |
| *H04N 19/42* | (2014.01) |

(52) U.S. Cl.
CPC ......... *H04N 19/154* (2014.11); *H04N 19/136* (2014.11); *H04N 19/172* (2014.11); *H04N 19/182* (2014.11); *H04N 19/184* (2014.11); *H04N 19/42* (2014.11)

(58) Field of Classification Search
CPC ............... H04N 19/154; H04N 19/136; H04N 19/172; H04N 19/182; H04N 19/184; H04N 19/42
See application file for complete search history.

(56) References Cited

U.S. PATENT DOCUMENTS

| | | | |
|---|---|---|---|
| 8,515,181 B2 | 8/2013 | Rezazadeh et al. | |
| 10,085,015 B1 | 9/2018 | Westwater et al. | |
| 10,165,281 B2 | 12/2018 | Wang et al. | |
| 2014/0055560 A1* | 2/2014 | Fu | G06T 7/50 348/E13.001 |
| 2018/0103230 A1* | 4/2018 | Vitta | H04N 7/0117 |
| 2018/0278936 A1* | 9/2018 | Hendry | H04N 19/126 |
| 2021/0409725 A1* | 12/2021 | Pedzisz | H04N 19/14 |
| 2022/0038747 A1* | 2/2022 | Lee | H04N 19/154 |

(Continued)

FOREIGN PATENT DOCUMENTS

WO    2022/018696 A1    1/2022

OTHER PUBLICATIONS

International Search Report for Application No. PCT/US2023/075279 dated Feb. 12, 2024.

(Continued)

*Primary Examiner* — Tracy Y. Li
(74) *Attorney, Agent, or Firm* — Artegis Law Group, LLP

(57) ABSTRACT

In various embodiments, a quality inference application estimates perceived video quality for reconstructed video. The quality inference application computes a set of feature values corresponding to a set of visual quality metrics based on a reconstructed frame, a source frame, a display resolution, and a normalized viewing distance. The quality inference application executes a trained perceptual quality model on the set of feature values to generate a perceptual quality score that indicates a perceived visual quality level for the reconstructed frame. The quality inference application performs one or more operations associated with an encoding process based on the perceptual quality score.

19 Claims, 6 Drawing Sheets

(56) References Cited

U.S. PATENT DOCUMENTS

| | | | |
|---|---|---|---|
| 2022/0051385 A1* | 2/2022 | Zhang | H04N 19/154 |
| 2022/0138455 A1* | 5/2022 | Nagano | G06T 5/006 |
| | | | 382/118 |
| 2022/0264168 A1* | 8/2022 | Dahl | H04L 65/612 |
| 2022/0295116 A1* | 9/2022 | Ma | H04N 19/176 |
| 2023/0065862 A1* | 3/2023 | Karabutov | G06V 10/44 |

OTHER PUBLICATIONS

Gu et al., "Quality Assessment Considering Viewing Distance and Image Resolution", DOI: 10.1109/TBC.2015.2459851, IEEE Transactions on Broadcasting, vol. 61, No. 3, Sep. 1, 2015, pp. 520-531.

Barman et al., "Parametric Quality Models for Multiscreen Video Systems", DOI: 10.1109/EUVIP53989.2022.9922693, 10th European Workshop on Visual Information Processing, Sep. 11, 2022, 6 pages.

Bampis et al., "Spatiotemporal Feature Integration and Model Fusion for Full Reference Video Quality Assessment", IEEE Transactions on Circuits and Systems for Video Technology, vol. 29, No. 8, Aug. 1, 2019, pp. 2256-2270.

* cited by examiner

TECHNIQUES FOR PREDICTING VIDEO QUALITY ACROSS DIFFERENT VIEWING PARAMETERS

BACKGROUND

Field of the Various Embodiments

The various embodiments relate generally to computer science and to video encoding technology and, more specifically, to techniques for predicting video quality across different viewing parameters.

Description of the Related Art

Efficiently and accurately encoding video content is an important aspect of streaming high-quality videos in real-time. Typically, as an encoded version of a video is streamed to a playback device, the encoded video content is decoded to generate a reconstructed video that is played back on the playback device. To increase the degree of compression and, accordingly, reduce the size of encoded videos, encoders typically execute lossy data compression algorithms to eliminate certain selected information. As a general matter, eliminating information during the encoding process can cause visual impairments or "distortions" that reduce the overall visual quality of a reconstructed video derived from an encoded video.

Because the number and types of distortions introduced during the encoding process can vary, quality controls are usually implemented to ensure that the visual quality of reconstructed video, as perceived by actual viewers of the reconstructed video, is at an acceptable level. This type of visual quality is oftentimes referred to as "perceptual video quality" or "perceived video quality." However, manually verifying the perceptual video quality of reconstructed videos can result in inaccurate assessments and also can be prohibitively time consuming and expensive. Therefore, some form of automated perceptual video quality assessment is sometimes integrated into the video encoding and transmission process. For example, automated perceptual video quality assessment could be used when encoding a given video to generate an encoded version of the video that attempts to achieve the highest predicted level of overall visual quality during playback of the video for a corresponding overall bitrate. In another example, automated perceptual video quality assessment could be used to estimate the numbers of bits used by different data compression algorithms to achieve certain perceptual video quality levels when evaluating different encoders/decoders.

One approach to automatically assessing perceptual video quality involves computing feature values for different features that are input into a conventional perceptual quality model based on a reconstructed video and an associated source video. The feature values are then mapped by the conventional perceptual quality model to a perceptual quality score that estimates the human-perceived video quality of the reconstructed video. The conventional perceptual quality model is trained based on assessments of perceived visual quality provided by humans viewing reconstructed training videos in accordance with a set of "training" viewing parameters. Two examples of training viewing parameters are a digital resolution height of 1080 pixels and a normalized viewing distance (NVD) of three times the physical height of a display screen.

One drawback of the above approach is that trained conventional perceptual quality models cannot accurately predict perceived video quality of reconstructed video content when the viewing parameters associated with an actual viewing experience differ from the viewing parameters used during training. For example, as the digital resolution height and/or the NVD associated with an actual viewing experience increases, the number of pixels within each degree of the visual angle of the viewer or "pixels-per-degree" (PPD) also increases. Within the ranges of PPD values commonly associated with actual viewing experiences, as the PPD value increases, distortions in reconstructed video content become less apparent to the viewer, which should increase the perceived video quality of the reconstructed video content. However, for a given actual viewing experience, if none of the feature values of the relevant conventional perceptual quality model are computed based on the PPD value associated with that actual viewing experience, then the trained conventional perceptual quality model ends up computing perceptual quality scores that are consistent with only the PPD value used during training, not the PPD value associated with the actual viewing experience. In such cases, the accuracy of the perceptual quality scores computed by the trained conventional perceptual video quality model can be substantially reduced. Inaccurate perceptual quality scores can result in erroneous visual quality/bitrate tradeoffs during the encoding process, which, in turn, can result in encoded videos having unnecessarily low levels of overall visual quality being streamed to actual viewers for playback. Given the relatively large number of combinations of digital resolution height and normalized viewing distance that can exist within the ranges of PPD values commonly associated with actual viewing experiences, properly training conventional perceptual quality models across those ranges of PPDs is not currently possible, which exacerbates the negative impacts on the encoding process and subsequent streaming experiences noted above.

As the foregoing illustrates, what is needed in the art are more effective techniques for predicting the perceived quality of reconstructed videos.

SUMMARY

One embodiment sets forth a computer-implemented method for estimating perceived video quality for reconstructed video. The method includes computing a first set of feature values corresponding to a set of visual quality metrics based on a first reconstructed frame, a first source frame, a first display resolution, and a first normalized viewing distance; executing a trained perceptual quality model on the first set of feature values to generate a first perceptual quality score that indicates a first perceived visual quality level for the first reconstructed frame; and performing one or more operations associated with an encoding process based on the first perceptual quality score.

At least one technical advantage of the disclosed techniques relative to the prior art is that, with the disclosed techniques, a trained perceptual quality model can be used to predict more accurate perceptual visual quality scores for reconstructed videos across a wider range of viewing parameters relative to what can be achieved using prior art approaches. In particular, unlike features of conventional perceptual quality models, the disclosed techniques incorporate a feature of the trained perceptual quality model that approximates an underlying relationship between PPD values and human perception of reconstructed video content quality. Thus, the trained perceptual quality model can be used to generate different perceptual quality scores for each different combination of display resolution and normalized viewing distance within the ranges of PPD values commonly associated with actual viewing experiences. Accordingly, implementing the trained perceptual quality model in the encoding process can improve the quality/bitrate tradeoffs typically made when encoding video content and, in turn, improve the overall streaming experience for viewers. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
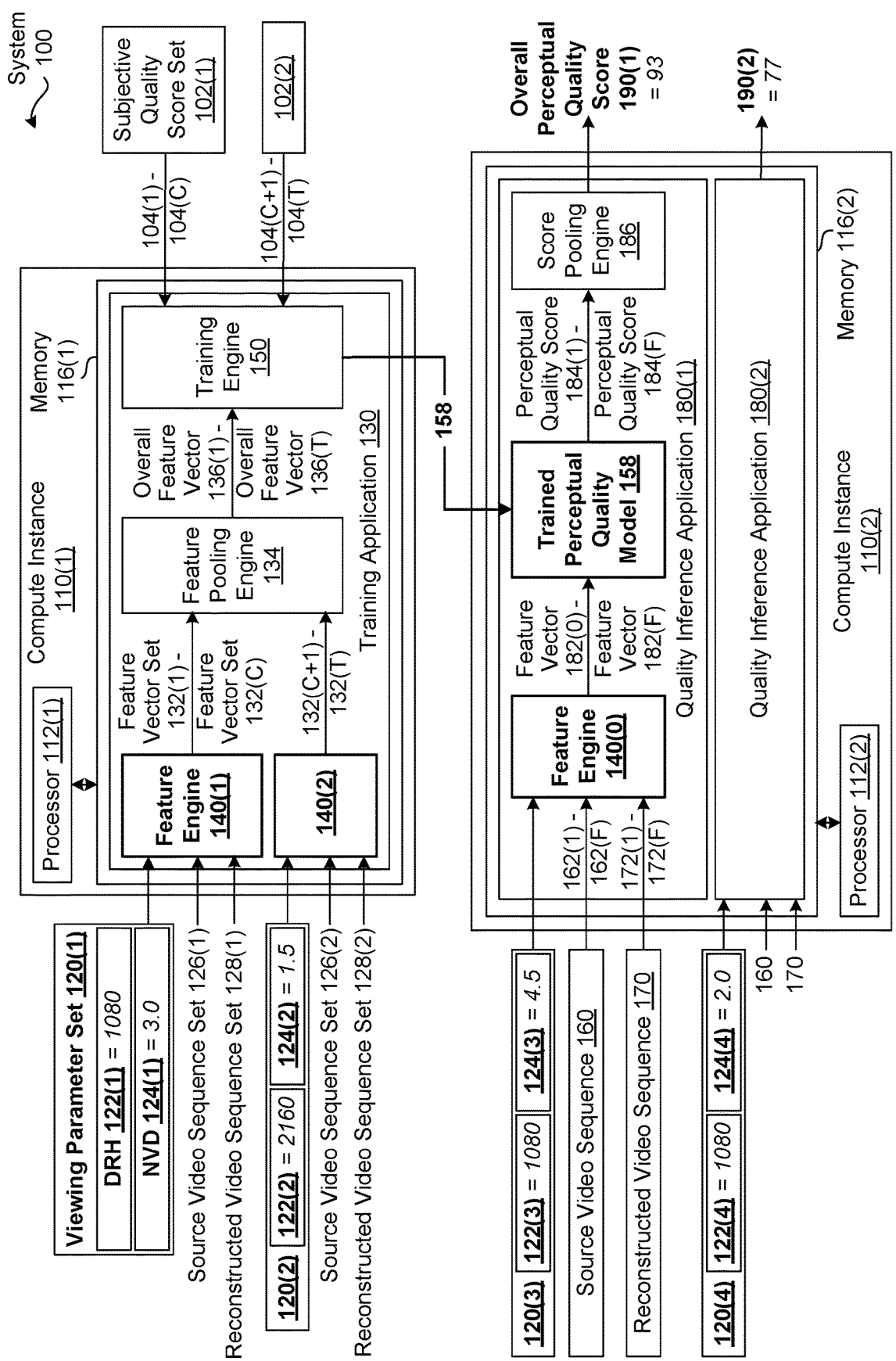
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details. For explanatory purposes, multiple instances of like objects are denoted with reference numbers identifying the object and parenthetical alphanumeric character(s) identifying the instance where needed.

A typical video streaming service provides access to a library of videos that can be viewed on a range of different playback devices, where each playback device usually connects to the video streaming service under different connection and network conditions. To efficiently deliver videos to playback devices, the video streaming service provider encodes the videos and then streams the resulting encoded videos to the playback devices. Each playback device decodes the stream of encoded video data and displays the resulting reconstructed video to viewers. To reduce the size of encoded videos, encoders typically leverage lossy data compression techniques that eliminate selected information. In general, eliminating information during encoding can lead to visual quality impairments or "distortions" that can reduce the visual quality of the reconstructed videos derived from encoded videos.

Because the number and types of distortions introduced when encoding videos varies, video streaming services typically implement quality controls to ensure that the visual quality of reconstructed videos as perceived by actual viewers ("perceptual video quality") is acceptable. In practice, because manually assessing the perceptual video quality of reconstructed videos can be prohibitively time consuming, some video streaming services integrate conventional perceptual quality models that estimate the perceptual video quality of reconstructed videos into the video encoding and transmission process. For example, some video streaming services use conventional perceptual quality models to set degree(s) of compression when encoding a video to ensure a target perceptual video quality level during playback of the associated reconstructed video content.

One drawback of using conventional perceptual quality models to estimate the perceptual video quality of reconstructed videos is that conventional perceptual quality models cannot accurately predict perceived video quality of reconstructed video content when the viewing parameters associated with an actual viewing experience differ from viewing parameters used during training. In that regard, each conventional perceptual quality model is trained based on assessments of perceived visual quality provided by humans viewing reconstructed training videos in accordance with a different set of "training" viewing parameters. For example, one perceptual quality model could be trained based on standard laptop-like full high definition (FHD) viewing conditions, where NVD is 3 (e.g., the viewing distance from a display is three times the physical height of the display) and a display having a resolution of 1920 pixels×1080 pixels.

Obtaining the vast number of human-observed visual quality scores that would be required to properly train different conventional perceptual quality models for the combinations of DRH and NVD that are commonly associated with actual viewing experiences is not feasible. Accordingly, a typical video encoding and transmission process uses a very small number of conventional perceptual quality models to generate perceptual quality scores that accurately predict perceived video quality for corresponding sets of training viewing parameters but do not accurately predict perceived video quality for many actual viewers. Inaccurate perceptual quality scores can result in erroneous visual quality/bitrate tradeoffs during the encoding process, which, in turn, can result in encoded videos having unnecessarily low levels of overall visual quality being streamed to actual viewers for playback.

With the disclosed techniques, however, a training application generates a single trained machine learning model that accounts for different viewing parameters when predicting perceptual quality scores. In one embodiment, the training application computes feature vectors corresponding to subjective quality scores in two subjective quality score sets that are associated with different combinations of a DRH and an NVD. Within a subjective quality score set, each subjective quality score is associated with a different reconstructed video sequence.

For each subjective quality score, the training application configures a feature engine to compute a feature vector based on the associated reconstructed video sequence, a corresponding source video sequence, the associated DRH, and the associated NVD. Notably, each feature vector is a set of feature values corresponding to a set of features that include VIF indices at four NVD-specific spatial scales, a DLM that is modified to account for PPD, and a conventional temporal information metric.

The VIF index is an image quality metric that can be used to estimate visual quality of a "reconstructed" frame of a reconstructed video sequence at an associated spatial scale based on an approximation of the amount of information shared between the reconstructed frame and a corresponding source frame as perceived by the human vision system (HVS). To approximate a multi-scale impact of NVD on visual quality as quantified by the VIF index, the feature engine computes values for the VIF index at four spatial scales that each vary in the same direction as the NVD. In other words, the feature engine varies the four spatial scales based on the NVD.

The DLM is an image quality metric that can be used to estimate visual quality of a reconstructed frame based on an approximation of the losses of useful visual information or "detail losses" in a reconstructed frame relative to a corresponding source frame. To model the impact of NVD and DRH on visual quality as quantified by the DLM, the feature engine implements a modified version of a conventional DLM referred to herein as a "PPD-aware DLM" that accounts for PPD when approximating detail losses. More specifically, the PPD-aware DLM approximates the impact of PPD on the visibility of a video distortion. For example, when the PPD increases, distortion visibility tends to decrease and the overall perceived quality increases.

The training engine executes a machine learning algorithm on the feature vectors and the corresponding subjective quality scores to generate a trained perceptual quality model that maps a feature vector corresponding to the set of feature values to a perceived quality score via a learned function. Subsequently, a quality inference application uses the trained perceptual quality model to compute any number of overall perceptual quality scores, where each overall perceptual quality score corresponds to a different combination of a reconstructed video sequence, a DRH, and an NVD.

In some embodiments, to compute an overall perceptual quality score, the quality inference application configures the feature engine to compute a different feature vector for each reconstructed frame of a reconstructed video sequence based on the reconstructed frame, a corresponding source frame, a DRH, and an NVD. For each reconstructed frame, the quality inference application inputs the associated feature vector into the trained perceptual quality model. In response, the trained perceptual quality model outputs a perceptual quality score for the reconstructed frame. The quality inference application computes the overall perceptual quality score for the reconstructed video sequence based on the perceptual quality scores for the reconstructed frames.

At least one technical advantage of the disclosed techniques relative to the prior art is that, with the disclosed techniques, a single trained perceptual quality model can be used to accurately predict different perceptual visual quality levels for reconstructed video sequences when viewed in accordance with different combinations of DRH and NVD. Accordingly, implementing the trained perceptual quality model in the encoding process can improve the quality/bitrate tradeoffs typically made when encoding video content and, in turn, improve the overall streaming experience for viewers. These technical advantages provide one or more technological advancements over prior art approaches.

System Overview

FIG. 1 is a conceptual illustration of a system 100 configured to implement one or more aspects of the various embodiments. As shown, in some embodiments, the system 100 includes, without limitation, a compute instance 110(1), a compute instance 110(2), a trained perceptual quality model 158, a viewing parameter set 120(1), a reconstructed video sequence set 128(1), a source video sequence set 126(1), a subjective quality score set 102(1), a viewing parameter set 120(2), a reconstructed video sequence set 128(2), a source video sequence set 126(2), a subjective quality score set 102(2), a viewing parameter set 120(3), a reconstructed video sequence 170, a source video sequence 160, an overall perceptual quality score 190(1), a viewing parameter set 120(4), and an overall perceptual quality score 190(2).

In some embodiments, the system 100 can include, without limitation, any number of other compute instances, any number of other viewing parameter sets, any number of other reconstructed video sequence sets, any number of other source video sequence sets, any number of subjective quality score sets, any number of other reconstructed videos, any number of other source videos and any number of overall perceptual quality scores. In some other embodiments, the system 100 can omit the compute instance 110(1) or the compute instance 110(2). In the same or other embodiments, the system 100 can omit the viewing parameter set 120(1), the reconstructed video sequence set 128(1), the source video sequence set 126(1), and the subjective quality score set 102(1) and/or the viewing parameter set 120(2), the reconstructed video sequence set 128(2), the source video sequence set 126(2), and the subjective quality score set 102(2). In some embodiments, the system 100 can omit the viewing parameter set 120(3), the reconstructed video sequence 170, the source video sequence 160, and the overall perceptual quality score 190(1) and/or the viewing parameter set 120(4) and the overall perceptual quality score 190(2), Any number of the components of the system 100 can be distributed across multiple geographic locations or implemented in one or more cloud computing environments (e.g., encapsulated shared resources, software, and data) in any combination. In some embodiments, each of the compute instance 110(1), the compute instance 110(2), and zero or more other compute instances can be implemented in a cloud computing environment, implemented as part of any other distributed computing environment, or implemented in a stand-alone fashion.

As shown, the compute instance 110(1) includes, without limitation, a processor 112(1) and a memory 116(1), and the compute instance 110(2) includes, without limitation, a processor 112(2) and a memory 116(2). For explanatory purposes, the compute instance 110(1) and the compute instance 110(2) are also referred to herein individually as "the compute instance 110" and collectively as "the compute instances 110." The processor 112(1) and the processor 112(2) are also referred to herein individually as "the processor 112" and collectively as "the processors 112." The memory 116(1) and the memory 116(2) are also referred to herein individually as "the memory 116" and collectively as "the memories 116."

The processor 112 can be any instruction execution system, apparatus, or device capable of executing instructions. For example, the processor 112 could be a central processing unit, a graphics processing unit, a controller, a microcontroller, a state machine, or any combination thereof. The memory 116 of the compute instance 110 stores content, such as software applications and data, for use by the processor 112 of the compute instance 110. The memory 116 can be one or more of a readily available memory, such as random-access memory, read-only memory, floppy disk, hard disk, or any other form of digital storage, local or remote.

In some other embodiments, each compute instance 110 can include any number of processors 112 and any number of memories 116 in any combination. In particular, any number of compute instances 110 (including one) and/or any number of other compute instances can provide a multiprocessing environment in any technically feasible fashion.

In some embodiments, a storage (not shown) can supplement or replace the memory 116 of the compute instance 110. The storage can include, without limitation, any number and type of external memories that are accessible to the processor 112 of the compute instance 110. For example, and without limitation, the storage can include a Secure Digital Card, an external Flash memory, a portable compact disc read-only memory, an optical storage device, a magnetic storage device, or any suitable combination of the foregoing.

In some embodiments, each compute instance 110 can be integrated with any number and/or types of other devices (e.g., one or more other compute instances and/or I/O devices) into a user device. Some examples of user devices include, without limitation, desktop computers, laptops, smartphones, smart televisions, game consoles, and tablets.

In general, each compute instance 110 is configured to implement one or more software applications. For explanatory purposes only, each software application is described as residing in the memory 116 of a single compute instance (e.g., the compute instance 110(1) or the compute instance 110(2)) and executing on the processor 112 of the single compute instances. In some embodiments, any number of instances of any number of software applications can reside in the memory 116 and any number of other memories associated with any number of other compute instances and execute on the processor 112 of the compute instance 110 and any number of other processors associated with any number of other compute instances in any combination. In the same or other embodiments, the functionality of any number of software applications can be distributed across any number of other software applications that reside in the memory 116 and any number of other memories associated with any number of other compute instances and execute on the processor 112 and any number of other processors associated with any number of other compute instances in any combination. Further, subsets of the functionality of multiple software applications can be consolidated into a single software application.

In particular, in some embodiments, the compute instance 110(2) is configured to estimate the perceptual video quality levels of reconstructed video sequences derived from source video sequences. An estimate of a "perceptual video quality" of a reconstructed video sequence, as used herein, refers to an estimate of the visual quality of the reconstructed video sequence as perceived by a typical viewer of the reconstructed video sequence during playback of the reconstructed video sequence.

A source video sequence includes, without limitation, a sequence of one or more still images that are commonly referred to as "frames." Some examples of source video sequences include, without limitation, a single frame, a shot, any portion (including all) of a feature length film, any portion (including all) of an episode of a television program, and any portion (including all) of a music video, to name a few. As used herein, the frames in a "shot" usually have similar spatial-temporal properties and run for an uninterrupted period of time. A source video sequence is also referred to herein as "source video."

Each source video sequence can be in any number and/or types of video formats and/or comply with any number and/or types of video standards. Two different source video sequences can be in the same or different video format(s) and/or comply with the same or different video standard(s). For example, two source video sequences could be in the same High Dynamic Range (HDR) format, a third source video sequence could be in a different HDR format, and a fourth source video sequence could be in a different standard dynamic range (SDR) format. Each frame in each source video sequence can be in any number and/or types of video formats and/or comply with any number and/or types of video standards.

A reconstructed video sequence is an approximate reconstruction of a corresponding source video sequence and includes, without limitation, a different "reconstructed" frame for each "source" frame of the source video sequence. A reconstructed video sequence can be derived from the corresponding source video sequence in any technically feasible fashion. In some embodiments, a source video sequence is encoded to generate an encoded video sequence (not shown) and then the encoded video sequence is decoded to generate a corresponding reconstructed video sequence. In this fashion, a reconstructed video sequence approximates a corresponding source video sequence as conveyed to a viewer via an encoding and streaming infrastructure and a playback device. A reconstructed video sequence is also referred to herein as "reconstructed video."

For explanatory purposes, the resolution of a reconstructed video is the same as the resolution of the corresponding source video. In some embodiments, an "original" source video can be downsampled and/or upsampled to generate one or more other source videos having different resolutions. Accordingly, multiple reconstructed videos can be derived from different source videos that are, in turn, derived from a single original source video.

As described previously herein, in some conventional systems, the perceptual video quality of reconstructed video sequences are estimated using a conventional perceptual quality model that is trained in accordance with a single set of "training" viewing parameters. Some examples of viewing parameters include, without limitation, an NVD and a digital resolution height (DRH). In some embodiments, an NVD is equal to a viewing distance (expressed in a unit of length) divided by the physical height (expressed in the same unit of length) of a display. A viewing distance can be expressed as a multiple of 'H', where H denotes the physical height of a display. For example, a viewing distance of "3H" specifies that a viewing distance from a display is three times the physical height of the display and therefore the NVD is 3. As used herein, a "display" refers to a portion of any type of display device that provides a visual output.

To estimate perceptual video quality for a reconstructed video using a conventional perceptual quality model, feature values for different features of the conventional perceptual quality model are computed based on the reconstructed video sequence and a corresponding source video sequence. The feature values are then inputted into the conventional perceptual quality model. In response, the conventional perceptual quality model computes and outputs a conventional perceptual quality score that estimates the perceptual video quality of the reconstructed video sequence.

However, none of the feature values of a conventional perceptual quality model are computed based on viewing parameters associated with an actual viewing experience.

Consequently, if the PPD for a given actual viewing experience differs from the PPD associated with the PPD associated with the training parameters, then the trained conventional perceptual quality model ends up computing perceptual quality scores that are consistent with only the PPD used during training, not the PPD associated with the actual viewing experience. In such cases, the accuracy of the perceptual quality scores computed by the trained conventional perceptual video quality model can be substantially reduced. Inaccurate perceptual quality scores can result in erroneous visual quality/bitrate tradeoffs during the encoding process, which, in turn, can result in encoded videos having unnecessarily low levels of overall visual quality being streamed to actual viewers for playback. Given the relatively large number of combinations of DRH and NVD that can exist within the ranges of PPD values commonly associated with actual viewing experiences, properly training conventional perceptual quality models across those ranges of PPD values is not currently possible, which exacerbates the negative impacts on the encoding process and subsequent streaming experiences noted above.

Accounting for Viewing Parameters when Estimating Perceptual Video Quality

To address the above problems, the system 100 includes, without limitation, a training application 130 that trains an untrained machine learning model (not shown) to account for the impact of different viewing parameters associated with different viewing experiences when estimating perceptual video quality of reconstructed video sequences. The resulting trained version of the machine learning model is also referred to herein as a trained perceptual quality model 158 and a unified perceptual quality model. Subsequently, in some embodiments, one or more instances of a quality inference application (not explicitly shown) can use the trained perceptual quality model 158 to account for different viewing parameters when estimating perceptual video quality of reconstructed video sequences.

As shown, in some embodiments, the training application 130 resides in the memory 116(1) of the compute instance 110(1) and executes on the processor 112(1) of the compute instance 110(1). As shown, in some embodiments, the training application 130 generates the trained perceptual quality model 158 based on the viewing parameter set 120(1), the reconstructed video sequence set 128(1), the source video sequence set 126(1), the subjective quality score set 102(1), the viewing parameter set 120(2), the reconstructed video sequence set 128(2), the source video sequence set 126(2), and the subjective quality score set 102(2).

As shown, in some embodiments, the viewing parameter set 120(1) includes, without limitation, a DRH 122(1) and an NVD 124(1). A DRH is also referred to herein as a "display resolution." In some other embodiments, the DRH 122(1) and/or any number of other DRHs can be replaced with any number and/or types of display resolutions and the techniques described herein are modified accordingly.

The source video sequence set 126(1) includes, without limitation, multiple source video sequences having vertical resolutions that are equal to the DRH 122(1). The reconstructed video sequence set 128(1) includes, without limitation, C different reconstructed video sequences (not shown) having vertical resolutions that are equal to the DRH 122(1), where C can be any positive integer. The reconstructed video sequences included in the reconstructed video sequence set 128(1) are derived from the source video sequences included in the source video sequence set 126(1).

The reconstructed video sequences included in the reconstructed video sequence set 128(1) can be derived from the source video sequences included in the source video sequence set 126(1). in any technically feasible fashion. For instance, in some embodiments, each source video sequence included in the source video sequence set 126(1) is encoded based on one or more sets of encoding parameters (not shown) to generate one or more encoded video sequences. The encoded video sequences are then decoded to generate the reconstructed video sequences included in the reconstructed video sequence set 128(1).

As shown, in some embodiments, the subjective quality score set 102(1) includes, without limitation, a subjective quality score 104(1)-a subjective quality score 104(C) that are each associated with the viewing parameter set 120(1) and a different reconstructed video sequence included in the reconstructed video sequence set 128(1). The subjective quality score set 102(1) is generated based on human-assigned individual quality scores (not shown) specifying visual quality levels of the reconstructed video sequences included in the reconstructed video sequence set 128(1) when viewed in accordance with the viewing parameter set 120(1). The individual quality scores and the subjective quality score 104(1)-the subjective quality score 104(C) can be determined in any technically feasible fashion.

In some embodiments, the individual quality scores are assigned by human participants in a subjective quality experiment. During the subjective quality experiment, participants view the reconstructed video sequences included in the reconstructed video sequence set 128(1) via displays having the DRH 122(1) from distances of NVD 124(1). The participants assign individual quality scores that rate the visual quality of the reconstructed video sequences. The participants can assess and rate the visual quality of the reconstructed video sequence based on any type of rating system.

The subjective quality score 104(1)-the subjective quality score 104(C) can be generated based on the individual quality scores in any technically feasible fashion. In some embodiments, each of the subjective quality score 104(1)-the subjective quality score 104(C) is set equal to the average or "mean opinion score" of the individual quality scores for the associated reconstructed video sequence. In some other embodiments, the subjective quality score 104(1)-the subjective quality score 104(C) are generated based on any type of subjective data model that takes into account the individual quality scores for the associated reconstructed video sequence.

As shown, in some embodiments, the viewing parameter set 120(2) includes, without limitation, a DRH 122(2) and an NVD 124(2). In some embodiments, the viewing parameter set 120(2) differs from the viewing parameter set 120(1). As depicted in italics, in some embodiments, the DRH 122(2) and the NVD 124(2) are 2160 pixels and 1.5, respectively, while the DRH 122(1) and the NVD 124(1) are 1080 pixels and 3.0, respectively.

The source video sequence set 126(2) includes, without limitation, multiple source video sequences having vertical resolutions that are equal to the DRH 122(2). The reconstructed video sequence set 128(2) includes, without limitation, (T-C) different reconstructed video sequences (not shown) having vertical resolutions that are equal to the DRH 122(2), where T can be any positive integer that is greater than C. The reconstructed video sequences included in the reconstructed video sequence set 128(2) are derived from the source video sequences included in the source video sequence set 126(2).

As shown, in some embodiments, the subjective quality score set 102(2) includes, without limitation, a subjective quality score 104(C+1)-a subjective quality score 104(T) that are each associated with the viewing parameter set 120(2) and a different reconstructed video sequence included in the reconstructed video sequence set 128(2). The subjective quality score set 102(2) is generated based on human-assigned individual quality scores (not shown) specifying visual quality levels of the reconstructed video sequences included in the reconstructed video sequence set 128(2) when viewed in accordance with the viewing parameter set 120(2). The individual quality scores and the subjective quality score 104(C+1)-the subjective quality score 104(T) can be determined in any technically feasible fashion.

For explanatory purposes, the subjective quality score (1)-subjective quality score 104(C) and the subjective quality score 104(C+1)-the subjective quality score 104(T) are also referred to herein individually as a "subjective quality score 104" and collectively as "subjective quality scores 104" and "subjective quality scores 104(1)-104(T)."

In some embodiments, each source video sequence in the source video sequence set 126(1) and each reconstructed video sequence in the reconstructed video sequence set 128(1) has a resolution of 1920 pixels×1080 pixels and is in an SDR format. The subjective quality score set 102(1) is derived from individual quality scores gathered during a "SDR FHD laptop" experiment. Each individual quality score assigned during the SDR FHD laptop experiment is an assessment of the quality of a reconstructed video sequence in the reconstructed video sequence set 128(1) when viewed on a laptop display having a resolution of 1920 pixels×1080 pixels from a viewing distance of 3 times the physical height of the laptop display. By contrast, each source video sequence in the source video sequence set 126(2) and each reconstructed video sequence in the reconstructed video sequence set 128(2) has a resolution of 3,840 pixels×2,160 pixels and is in an HDR format. The subjective quality score set 102(2) is derived from individual quality scores gathered during an "HDR 4K home-theater" experiment. Each individual quality score assigned during the HDR 4K home-theater experiment is an assessment of the quality of a reconstructed video sequence in the reconstructed video sequence set 128(2) when viewed on a television display having a resolution of 3,840 pixels×2,160 pixels from a viewing distance of 1.5 times the physical height of the television display.

As shown, in some embodiments, the training application 130 includes, without limitation, a feature engine 140(1), a feature engine 140(2), a feature pooling engine 134, and a training engine 150. The feature engine 140(1) and the feature engine 140(2) are two instances of a single software application, referred to herein as a feature engine 140 (not explicitly shown).

In some embodiments, each instance of the feature engine 140 computes a different feature vector set for each of one or more reconstructed video sequences based on the reconstructed video sequences(s), corresponding source video sequence(s), and a viewing parameter set. Each feature vector set includes, without limitation, a different feature vector for each reconstructed frame of an associated reconstructed video sequence. For example, if a reconstructed video sequence were to include 8640 frames, then a feature vector set associated with the reconstructed video sequence would include, without limitation, 8640 feature vectors.

In some other embodiments, each feature engine 140 can compute feature vector(s) at any level of granularity, and the techniques described herein are modified accordingly. For instance, in some embodiments, the feature engine 140 computes a single feature vector for each reconstructed video sequence, irrespective of the total number of frames included in the reconstructed video sequence.

Each feature vector includes, without limitation, a different value for each feature included in a feature set (not shown in FIG. 1). A value for a feature is also referred to herein as a "feature value." Each feature is a quantifiable measure that can be used to assess at least one aspect of visual quality associated with reconstructed video content. In some embodiments, the feature set includes, without limitation, any number and/or types of features that are related to any number of aspects of video quality, where at least one of the features is computed based on at least one of an NVD, a DRH, or any other display resolution. As used herein, "video quality" refers to a visual quality level associated with a reconstructed video sequence or any other video sequence.

The features included in the feature vector can be determined in any technically feasible fashion based on any number and/or types of criteria. In some embodiments, the features included in the feature vector are empirically selected to provide valuable insight into the visual quality across the range of the reconstructed video sequences included in the reconstructed video sequence set 128(1) and the reconstructed video sequence set 128(20. In the same or other embodiments, the features included in the feature set are empirically selected to provide insight into the impacts of any number and/or types of artifacts on perceptual video quality. For example, the selected features can provide insight into, without limitation, blocking, staircase noise, color bleeding, and flickering on perceptual visual quality.

In some embodiments, the feature set includes, without limitation, a temporal feature and any number of objective image quality metrics, where each objective image quality metric exhibits both strengths and weaknesses. To leverage the strengths and mitigate the weaknesses, the feature set includes, without limitation, multiple objective image quality metrics having complementary strengths.

As described in greater detail below in conjunction with FIG. 2, in some embodiments, the feature set includes, without limitation, six features that are denoted herein as $NVD\_VIF_1$, $NVD\_VIF_2$, $NVD\_VIF_3$, $NVD\_VIF_4$, PPD_DLM, and TI. For explanatory purposes, values corresponding to $NVD\_VIF_1$, $NVD\_VIF_2$, $NVD\_VIF_3$, $NVD\_VIF_4$, PPD_DLM, and TI are also referred to herein as $NVD\_VIF_1$ values, $NVD\_VIF_2$ values, $NVD\_VIF_3$ values, $NVD\_VIF_4$ values, PPD_DLM values, and TI values, respectively.

The features denoted $NVD\_VIF_1$, $NVD\_VIF_2$, $NVD\_VIF_3$, and $NVD\_VIF_4$ are VIF indices at four spatial scales (not explicitly shown), where the four spatial scales are determined based on an NVD. In some embodiments, the feature engine 140 computes an $NVD\_VIF_1$ value, an $NVD\_VIF_2$ value, an $NVD\_VIF_3$ value, and an $NVD\_VIF_4$ value based on a reconstructed frame, a corresponding source frame, and an NVD.

The feature denoted PPD_DLM is a PPD-aware DLM. Unlike values of conventional versions of the DLM that are associated with some conventional perceptual quality models, the feature engine 140 computes a PPD_DLM value based on a reconstructed frame, a corresponding source frame, a PPD value and, optionally, an NVD.

The feature denoted TI is a temporal information metric that captures temporal distortions associated with and/or causing motion that are quantified by differences between adjacent pairs of the reconstructed frames included in a reconstructed video sequence.

As shown, in some embodiments, the feature engine 140(1) computes a feature vector set 132(1)-a feature vector set 132(C) based on the reconstructed video sequence set 128(1), the source video sequence set 126(1), and the viewing parameter set 120(1). Each of feature vector set 132(1)-feature vector set 132(C) includes, without limitation, a different feature vector for each reconstructed frame included in a reconstructed video sequence that is associated with the subjective quality score 104(1)-the subjective quality score 104(C), respectively. A feature set that is associated with a reconstructed frame includes feature values that are also referred to herein individually as a "frame feature value." Multiple feature values that are associated with the same reconstructed frame, different reconstructed frames, or any combination thereof are also referred to herein collectively as "frame feature values."

In the same or other embodiments, the feature engine 140(2) computes a feature vector set 132(C+1)-a feature vector set 132(T) based on the reconstructed video sequence set 128(2), the source video sequence set 126(2), and the viewing parameter set 120(2). Each of the feature vector set 132(C+1)-the feature vector set 132(T) includes, without limitation, a different feature vector for each reconstructed frame included in a reconstructed video sequence that is associated with the subjective quality score 104(C+1)-the subjective quality score 104(T), respectively.

As shown, in some embodiments, the training application 130 inputs the feature vector set 132(1)-the feature vector set 132(C) and the feature vector set 132(C+1)-the feature vector set 132(T) into the feature pooling engine 134. In response, the feature pooling engine 134 generates and outputs an overall feature vector 136(1)-an overall feature vector 136(T), respectively. For explanatory purposes, the overall feature vector 136(1)-the overall feature vector 136(T) are also referred to herein individually as an "overall feature vector 136" and collectively as "overall feature vectors 136" and "overall feature vectors 136(1)-136(T)."

Each of the overall feature vectors 136 is a different set of overall feature values for the feature vector. In some embodiments, the overall feature vectors 136(1)-t136(T) are sets of overall feature values associated with reconstructed video sequences corresponding to the subjective quality scores 104(1)-104(T), respectively. As used herein, a feature vector that is associated with a reconstructed video sequence is also referred to herein as an "overall feature value."

The feature pooling engine 134 can compute the overall feature vector 136($j$), where j is an integer from 1 through T, based on the feature vector set 132($j$) in any technically feasible fashion. In some embodiments, the feature pooling engine 134 sets each overall feature value in the overall feature vector 136($j$) equal to the arithmetic mean of the associated feature values in the feature vectors included in the feature vector set 132($j$). In this fashion, each of the overall feature values in the overall feature vector 136($j$) represents an average feature value for the associated feature across the frames included in the reconstructed video sequences associated with the subjective quality score 104($j$).

As shown, in some embodiments, the training engine 150 generates the trained perceptual quality model 158 based on the overall feature vectors 136(1)-136(T) and the subjective quality scores 104(1)-104(T). For explanatory purposes, for an integer j from 1 through T, a $j^{th}$ "training sample" refers to a pair of the overall feature vector 136($j$) and the subjective quality score 104($j$). Accordingly, the $1^{st}$ through $T^{th}$ training samples include the overall feature vectors 136(1)-136(T), respectively, and the subjective quality scores 104(1)-104(T), respectively.

The training application 130 can execute any number and/or types of supervised machine learning algorithms on the training samples to train an untrained machine learning model, thereby generating a trained machine learning model. As noted previously herein, the trained perceptual quality model 158 constitutes a trained machine learning model.

The trained perceptual quality model 158 maps a feature vector corresponding to the feature set, a portion of a reconstructed video, and a viewing parameter set to a perceptual quality score for the portion of the reconstructed video when viewed in accordance with the viewing parameter set. Both the untrained machine learning model and the trained perceptual quality model 158 are associated with the same feature set.

Some examples of supervised machine learning algorithms that can be implemented with the various embodiments include, without limitation, a support vector regression (SVR), an artificial neural network algorithm (e.g., a multi layer perceptron regression), a tree-based regression algorithm, and a tree-based ensemble method (e.g., a random forest algorithm or a gradient boosting algorithm). A training application can use SVR, an artificial neural network algorithm, or a tree-based regression algorithm to generate a trained SVR model, a trained artificial neural network, or a trained regression tree, respectively. An SVR model is also referred to herein as a trained Support Vector Machine (SVM).

In one embodiment, the training application 130 uses SVR to train or "fit" an SVR model to a hyperplane based on an optimization goal of maximizing the number of training samples within a threshold (commonly denoted as denoted as c) of the hyperplane. The hyperplane defines a "learned" function in terms of a subset of the training samples, learned weights, a learned bias, and optionally a kernel function that computes the inner product between two feature vectors in a suitable feature space. In some embodiments, the SVR model implements a radian basis function (RBF) kernel that can be expressed using the following equation:

$$K(x,x') = \exp(-\gamma \|x-x'\|^2) \quad (1)$$

In equation (1), x and x' denote two feature vectors and $\gamma$ is a hyperparameter of the SVR model that defines how far the influence of a single training sample reaches.

The SVR model is referred to as an "untrained" SVR model before the training application 130 begins to execute the SVR algorithm on the training samples. The SVR model is referred to as a "trained" SVR model after the training application 130 finishes executing the SVR algorithm on the training samples. The trained SVR model constitutes the trained perceptual quality model 158. The training application 130 can configure any type of SVR to train any type of SVR model based on the overall feature vectors 136(1)-136(T) and the subjective quality scores 104(1)-104(T) in any technically feasible fashion.

In particular, continuing with the same embodiment, the training application 130 executes a Scikit-Learn implementation of an SVR to train a Scikit-Learn implementation of an SVM that uses an RBF kernel (commonly referred to as an RBF kernel SVM). Detailed descriptions of several Scikit-Learn implementations of SVRs, SVMs, and kernel functions are described in greater detail in the following article:
https://scikit-learn.org/stable/modules/svm.html#regression After completing the above step, the trained perceptual quality model 158 implements a learned function denoted herein as score(x) that computes a perceptual quality score based on a feature vector x and can be expressed using the following equation:

$$\text{score}(x) = \sum_{j=1}^{T} \alpha_j y_j K(x, x_j) + b \qquad (2)$$

In equation (2), T is the total number of training samples, $x_1$-$x_T$ denote the overall feature vectors 136(1)-136(T), respectively, $y_1$-$y_T$ denote the subjective quality scores 104(1)-104(T), respectively, $a_1$-$a_T$ are learned weights, b is a learned bias, and $K(x, x_j)$ is a kernel function (e.g., the RBF kernel defined by equation (1)). For an integer j from 1 through T, if $\alpha_j$ is equal to zero, then the $j^{th}$ training sample (i.e., the pair of x(j) and y(j)) is not used to compute perceptual quality scores. Otherwise, the $j^{th}$ training sample is also referred to as a "support vector" and is used to compute perceptual quality scores. As persons skilled in the art will recognize, equation (2) defines a perceptual quality score corresponding to a reconstructed video sequence and a viewing parameter set as a weighted combination of a feature vector corresponding to the reconstructed video sequence, the viewing parameter set, and a feature set associated with the trained perceptual quality model 158. Accordingly, equation (2) defines a perceptual quality score as a weighted sum of the feature values included in a corresponding feature vector.

Advantageously, the trained perceptual quality model 158 is able to estimate the impact of different DRHs and NVDs (and therefore different PPD values) on visual quality, as perceived by actual human viewers of reconstructed videos. In that regard, because feature vectors are computed based on DRHs and NVDs, the trained perceptual quality model 158 can compute significantly different perceptual quality scores corresponding to the same reconstructed video sequence and different DRHs and/or NVDs. Consequently, unlike a prior-art perceptual quality model, the trained perceptual quality model 158 can accurately estimate perceptual video quality levels for reconstructed videos for a wide variety of viewing parameters.

As shown, in some embodiments, the training application 130 transmits the trained perceptual quality model 158 to a quality inference application 180(1) and a quality inference application 180(2). The quality inference application 180(1) and the quality inference application 180(2) are two instances of a single software application that is also referred to herein as a "quality inference application 180" (not explicitly shown). In some embodiments, the training application 130 can transmit the trained perceptual quality model 158 to any number of other instances of the quality inference application instead of or in addition to transmitting the trained perceptual quality model 158 to the quality inference application 180(1) and/or the quality inference application 180(2). In the same or other embodiments, the training application 130 can transmit the trained perceptual quality model 158 to any number and/or types of software applications. In some embodiments, the training application 130 can store the trained perceptual quality model 158 in any number and/or types of available memories.

As shown, in some embodiments, the quality inference application 180(1) and the quality inference application 180(2) reside in the memory 116(2) of the compute instance 110(2) and executes on the processor 112(2) of the compute instance 110(2). For explanatory purposes, the functionality of each instance of the quality inference application 180 is described herein in the context of the quality inference application 180(1).

As shown, in some embodiments, the quality inference application 180(1) computes an overall perceptual quality score 190(1) based on the viewing parameter set 120(3), the source video sequence 160, and the reconstructed video sequence 170. The overall perceptual quality score 190(1) predicts the perceptual video quality for the reconstructed video sequence 170 when viewed in accordance with the viewing parameter set 120(3).

The viewing parameter set 120(3) includes, without limitation, a DRH 122(3) and an NVD 124(3). In some embodiments, as depicted in italics, the DRH 122(3) is 1080 pixels and the NVD 124(3) is 4.5. Notably, the viewing parameter set 120(3) differs from both the viewing parameter set 120(1) and the viewing parameter set 120(2). The source video sequence 160 includes, without limitation, a source frame 162(1)-a source frame 162(F), where F can be any positive integer. The reconstructed video sequence 170 includes, without limitation, a reconstructed frame 172(1)-a reconstructed frame 172(F), where F can be any positive integer.

For explanatory purposes, the source frame 162(1)-the source frame 162(F) are also referred to herein individually as a "source frame 162" and collectively as "source frames 162" and "source frames 162(1)-162(F)." For explanatory purposes, the reconstructed frame 172(1)-reconstructed frame 172(F) are also referred to herein individually as a "reconstructed frame 172" and collectively as "reconstructed frames 172" and "reconstructed frames 172(1)-172(F)."

The reconstructed frames 172(1)-172(F) are approximations of the source frames 162(1)-162(F), respectively, that are derived in any technically feasible fashion. For instance, in some embodiments, the source frames 162(1)-162(F) are encoded to generate source encoded frames, and the source encoded frames are decoded to generate the reconstructed frames 172(1)-172(F), respectively.

As shown, in one embodiment, the quality inference application 180(1) includes, without limitation, a feature engine 140(0), the trained perceptual quality model 158, and a score pooling engine 186. The feature engine 140(0) is an instance of the feature engine 140 described previously herein in conjunction with the training application 130. In some embodiments, the feature engine 140(0) computes a feature vector 182(1)-a feature vector 182(T) based on the source frames 162(1)-162(F), respectively, the reconstructed frames 172(1)-172(F), respectively, and the viewing parameter set 120(3).

For explanatory purposes, the feature vector 182(1)-the feature vector 182(T) are also referred to herein individually as a "feature vector 182" and collectively as "feature vectors 182" and "feature vectors 182(1)-182(F)." Each feature vector 182 includes, without limitation, a different feature value for each feature in the feature set associated with the trained perceptual quality model 158.

As shown, the quality inference application 180(1) inputs the feature vectors 182(1)-182(F) into the trained perceptual quality model 158. In response, the trained perceptual quality model 158 computes and outputs a perceptual quality score 184(1)-a perceptual quality score 184(F). For explanatory purposes, the perceptual quality score 184(1)-the perceptual quality score 184(F) are also referred to herein individually as a "perceptual quality score 184" and collectively as "perceptual quality scores 184" and "perceptual quality scores 184(1)-184(F)."

As shown, the quality inference application 180(1) includes multiple instances of the trained perceptual quality model 158, and the trained perceptual quality model 158 inputs the feature vectors 182(1)-182(F) into any number of instances of the trained perceptual quality model 158 sequentially, concurrently, or in any combination thereof. For instance, in some embodiments, the quality inference application 180(1) concurrently inputs the feature vectors 182(1)-182(F) into F instances of the trained perceptual quality model 158. In response, the F instances of the trained perceptual quality model 158 concurrently output the perceptual quality scores 184(1)-184(F).

As shown, the quality inference application 180(1) inputs the perceptual quality scores 184(1)-184(F) into the score pooling engine 186. In response, the score pooling engine 186 generates and outputs the overall perceptual quality score 190(1). The score pooling engine 186 can compute the overall perceptual quality score 190(1) based on the perceptual quality scores 184(1)-184(F) in any technically feasible fashion.

In some embodiments, the score pooling engine 186 performs any number and/or types of temporal pooling operations on the perceptual quality scores 184(1)-184(F) to compute the overall perceptual quality score 190(1). For instance, in some embodiments, the score pooling engine 186 sets the overall perceptual quality score 190(1) equal to the arithmetic mean of the perceptual quality scores 184(1)-184(F). Accordingly, the overall perceptual quality score 190(1) represents an average perceptual video quality across the frames included in the reconstructed video sequence when viewed in accordance with the viewing parameter set 120(3).

In some embodiments, the score pooling engine 186 performs any number and/or types of hysteresis pooling operations that mimic the relatively smooth variance of human opinion scores in response to changes in video quality. For instance, in some embodiments, the score pooling engine 186 could perform both linear low pass operations and non-linear (rank-order) weighting operations on the perceptual quality scores 184(1)-184(F) to compute the overall perceptual quality score 190(1).

As shown, the quality inference application 180(1) transmits the overall perceptual quality score 190(1) and/or any number of the perceptual quality scores 184(1)-184(F) to any number and/or types of software applications. In the same or other embodiments, the training application 130 quality inference application 180(1) stores the overall perceptual quality score 190(1) and/or any number of the perceptual quality scores 184(1)-184(F) in any number and/or types of available memories.

In some embodiments, the quality inference application 180(1) can aggregate any number of perceptual quality scores corresponding to any number of reconstructed frames and the viewing parameter set 120(1) in any technically feasible fashion to generate any number and/or types of aggregated perceptual quality scores. For instance, in some embodiments, the quality inference application 180(1) generates S per-shot perceptual quality scores for S different shots that are included in the reconstructed video sequence 170.

In some other embodiments, the quality inference application 180(1) can input any number of feature vectors associated with any level of granularity into the trained perceptual quality model 158, and the techniques described herein are modified accordingly. For instance, in some embodiments, the quality inference application 180 inputs the feature vectors 182(1)-184(F) into an instance of the feature pooling engine 134 described previously herein in conjunction with the training applicator 130. In response, the feature pooling engine 134 outputs an overall feature vector (not shown). The quality inference application 180(1) then inputs the overall feature vector into the trained perceptual quality model 158. In response, the trained perceptual quality model 158 outputs an overall perceptual quality score.

As shown, in some embodiments, the quality inference application 180(2) computes an overall perceptual quality score 190(2) based on the viewing parameter set 120(4), the source video sequence 160, and the reconstructed video sequence 170. The overall perceptual quality score 190(2) predicts the perceptual video quality for the reconstructed video sequence 170 when viewed in accordance with the viewing parameter set 120(4).

The viewing parameter set 120(4) includes, without limitation, a DRH 122(4) and an NVD 124(4). In some embodiments, as depicted in italics, the DRH 122(4) is 1080 pixels and the NVD 124(3) is 2.0. Notably, the viewing parameter set 120(4) differs from the viewing parameter set 120(1), the viewing parameter set 120(2), and the viewing parameter set 120(3).

As depicted in italics, in some embodiments, the overall perceptual quality score 190(1) and the overall perceptual quality score 190(2) corresponding to the reconstructed video sequence 170 when viewed in accordance with the viewing parameter set 120(3) and the viewing parameter set 120(4), respectively, are 93 and 77.

Advantageously, unlike some prior-art perceptual quality models, because the quality inference application 180 can use the trained perceptual quality model 158 to compute different perceptual quality scores based on different viewing parameters, better decisions can be made based on the perceptual quality scores and therefore an overall quality of experience when streaming videos can be increased.

In that regard, any number of perceptual quality scores (e.g., the perceptual quality scores 184(1)-184(F), the overall perceptual quality score 190(1), and the overall perceptual quality score 190(2)) can be used for various encoding process operations. For example, any number of perceptual quality scores can be used to compute a tradeoff between quality and bitrate when encoding a source video sequence. In another example, any number of perceptual quality scores can be used to evaluate and/or fine-tune an encoder, a decoder, an adaptive bitrate streaming algorithm, or any combination thereof.

In yet another example, the quality inference application 180 can be configured to compute overall perceptual quality scores corresponding to multiple reconstructed video sequences derived from different encoded versions of the source video sequence 160 when viewed in accordance with different viewing parameter sets. For each viewing parameter set, a different bitrate ladder can be generated based on the overall perceptual quality scores corresponding to the viewing parameter set. Each bitrate ladder specifies a subset of the encoded versions of the source video sequence 160, associated bitrates, and associated overall perceptual quality scores corresponding to a different viewing parameter set. Subsequently, a client application (e.g., executing an adaptive bitrate streaming algorithm) can use the bitrate ladder corresponding to the source video sequence 160 and a viewing parameter set that is a closest match to the actual viewing parameters to select one of and/or switch between the encoded versions of the source video sequence 160 for streaming and playback based on bitrate.

Although not shown, in some embodiments, the quality inference application 180(1) offsets and/or clips the perceptual quality scores 184(1)-184(F) or the overall perceptual quality score 190(1) based on a set of PPD-specific offsets that reflect subjective quality scores corresponding to different combinations of reconstructed video clips, DRHs, and NVDs. In some embodiments, each PPD-specific offset in the set of PPD-specific offsets is either a negative or positive integer that corresponds to a different PPD value.

Although not shown, in one embodiment, the quality inference application 180(1) computes an actual PPD value based on the DRH 122(3) and the NVD 124(3). More precisely, the quality inference application 180(1) computes the actual PPD value using an equation (4) that is described in greater detail below in conjunction with FIG. 2. In other embodiments, other technically feasible techniques for computing the actual PPD value may be implemented. The quality inference application 180(1) selects a PPD-specific offset from the set of PPD-specific offsets based on the actual PPD value. The quality inference application 180(1) adds the PPD-specific offset to the overall perceptual quality score 190(1) to generate an "absolute" perceptual visual quality score that is aligned across PPD values.

In some embodiments, PPD values are computed for subjective quality scores corresponding to different combinations of reconstructed video clips, DRHs, and NVDs. A percentage quality drop is computed between a PPD value of 120, and each lower PPD value based on a subset of the subjective quality scores corresponding to the highest quality video sequences for the PPD value of 120 and the highest quality video sequences for the lower PPD value. A curve of highest perceptual quality score vs PPD value is generated based on the percentage quality drops and zero or more constraints. For example, two constraints could be that the maximum perceptual quality scores for PPD values of 120 and 60 are 100 and 95, respectively. For each PPD value, a PPD-specific offset is set equal to the highest perceptual quality score for the PPD value minus 100. In other embodiments, other technically feasible techniques for computing the PPD-specific offsets may be implemented.

In some embodiments, the source video sequence 160 and the reconstructed video sequence 170 are both in an HDR format. In some other embodiments, the source video sequence 160 and the reconstructed video sequence 170 are both in an SDR format. In general, the quality inference application 180 or any other software application can use the trained perceptual quality model 158 to compute an overall perceptual quality score for any reconstructed video sequence that has any vertical resolution and any horizontal resolution, is in any number and/or types of format(s), and is associated with any number and/or types of video standard(s).

Note that the techniques described herein are illustrative rather than restrictive and may be altered without departing from the broader spirit and scope of the invention. Many modifications and variations on the functionality provided by the training application 130, the feature engine 140, the feature pooling engine 134, the training engine 150, the trained perceptual quality model 158, the quality inference application 180, and the score pooling engine 186 will be apparent to those of ordinary skill in the art without departing from the scope and spirit of the described embodiments.

It will be appreciated that the system 100 shown herein is illustrative and that variations and modifications are possible. For instance, in some embodiments, the training application 130 can apply any number and/or types of machine learning algorithms to any number and/or types training samples representing any number of features at any level of granularity to generate any type of trained machine learning model that implements any type of video quality metric. Further, the connection topology between the various components in FIG. 1 may be modified as desired. For instance, in some embodiments, the feature engine 140(1) and the feature engine 140(2) reside and execute in a cloud environment instead of residing within the training application 130.

Computing Feature Vectors Based on Viewing Parameters

Figure 2:
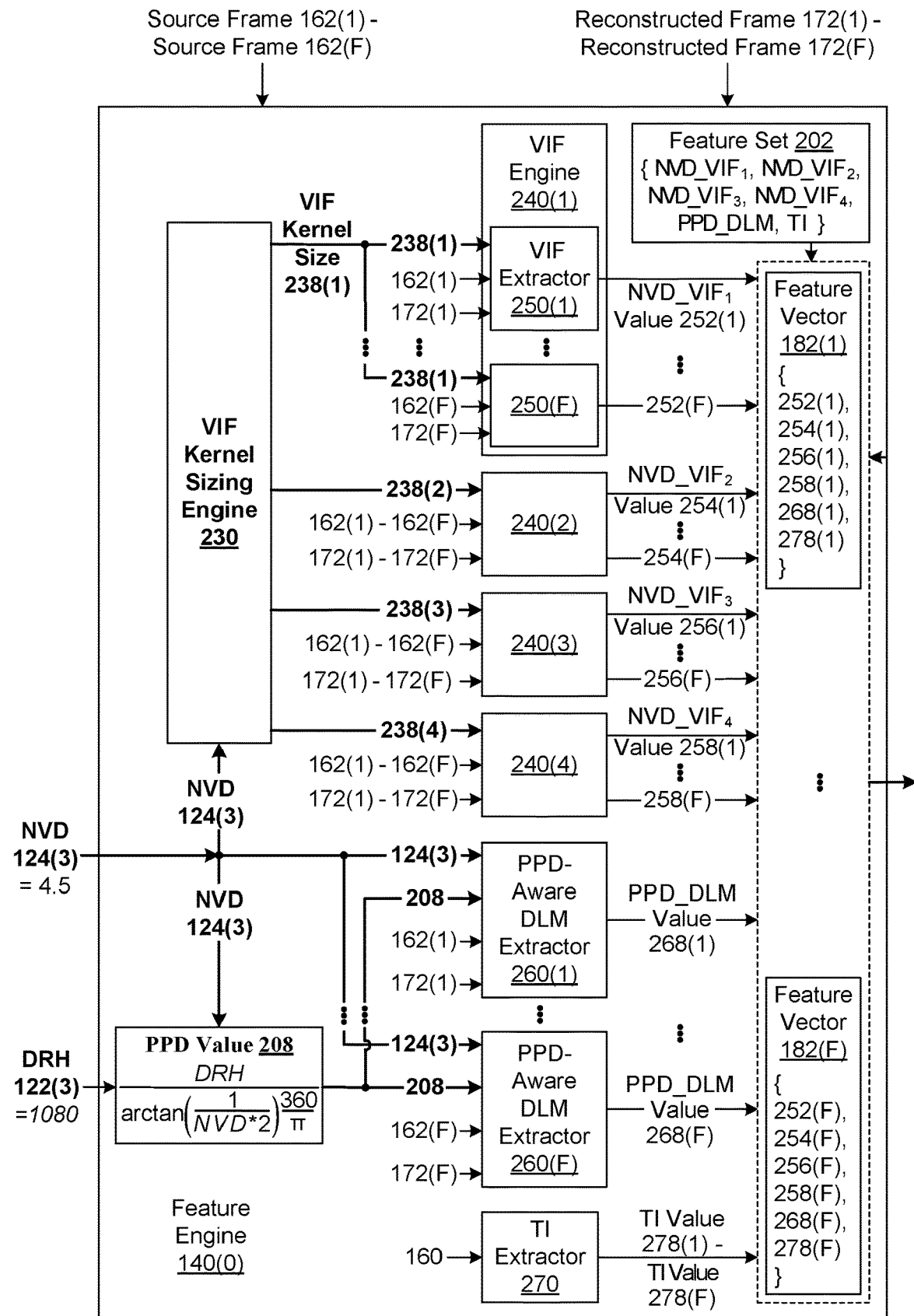
FIG. 2 is a more detailed illustration of one of the feature engines of FIG. 1, according to various embodiments.

FIG. 2 is a more detailed illustration of one of the feature engines 140 of FIG. 1, according to various embodiments. For explanatory purposes, the functionality of the feature engine 140 that computes one or more feature vectors corresponding to a feature set, one or more reconstructed frames, a DRH, and an NVD is described in conjunction with FIG. 2 in the context of the feature engine 140(0) of FIG. 1.

In some embodiments, the feature engine 140(0) is an instance of the feature engine 140 that computes the feature vectors 182(1)-182(F) based on the reconstructed frames 172(1)-172(F), respectively, the source frames 162(1)-162(F), respectively, the DRH 122(3), and the NVD 124(3). In the same or other embodiments, the feature vectors 182(1)-182(F) correspond to a feature set 202, the reconstructed frames 172(1)-172(F), respectively, the DRH 122(3), and the NVD 124(3). As shown, in some embodiments, the feature engine 140(0) includes, without limitation, the feature vectors 182, a feature set 202, a VIF engine 240(1)-a VIF engine 240(4), a VIF kernel sizing engine 230, a PPD value 208, a PPD-aware DLM extractor 260(1)-a PPD-aware DLM extractor 260(F), a TI extractor 270.

In some embodiments, each of the feature vectors 182 includes, without limitation, a different feature value for each feature in the feature set 202. As shown, in some embodiments, the feature set 202 includes, without limitation, six features that are denoted herein as $NVD\_VIF_1$, $NVD\_VIF_2$, $NVD\_VIF_3$, $NVD\_VIF_4$, PPD_DLM, and TI. In some other embodiments, the feature set 202 can include any number and/or types of features that are related to any number of aspects of video quality, where at least one of the features is computed based on at least one of an NVD, a DRH, or any other display resolution.

The features denoted $NVD\_VIF_1$, $NVD\_VIF_2$, $NVD\_VIF_3$, $NVD\_VIF_4$ are Visual Information Fidelity (VIF) indices at four NVD-specific spatial scales (not explicitly shown) corresponding to scaling indies (not shown) of 1-4, respectively. A VIF index at an NVD-specific spatial scale is also referred to herein as an "NVD-aware VIF index" at the spatial scale. Unlike VIF indices that are associated with some conventional perceptual quality models, an NVD-aware VIF index indirectly takes into account an NVD via the associated spatial scale.

As persons skilled in the art will recognize, the VIF index is an image quality metric that estimates visual quality of a distorted image at an associated spatial scale based on an approximation of the amount of information shared between a reference image and the distorted image as perceived by the HVS. As used herein, an "image quality metric" is a type of visual quality metric that is used to estimate the visual quality of distorted images (e.g., reconstructed frames).

In some embodiments, a VIF extractor 250 (not explicitly depicted) implements a pixel-domain version of the VIF index. As described in greater detail below in conjunction with FIG. 3, in some embodiments, the VIF extractor 250 computes a VIF value based on a reconstructed frame, a corresponding source frame, and a VIF kernel size that inherently defines an NVD-specific spatial scale. More specifically, in some embodiments, the VIF extractor 250 generates a Gaussian 2D kernel having dimensions and a standard deviation that are proportional to the VIF kernel size. The VIF extractor 250 convolves the reconstructed frame with the Gaussian 2D kernel to generate a filtered reconstructed image and convolves the source frame with the Gaussian 2D kernel to generate a filtered source image. The VIF extractor 250 then estimates the fraction of the information in the filtered source image that the HVS can extract from the filtered reconstructed image to compute a VIF value for the reconstructed frame at the NVD-specific spatial scale.

As shown, in some embodiments, the VIF kernel sizing engine 230 computes a VIF kernel size 238(1)-a VIF kernel size 238(4) based on the NVD 124(3). For explanatory purposes, the VIF kernel size 238(1)-the VIF kernel size 238(4) are also referred to herein individually as a "VIF kernel size 238" and collectively as "VIF kernel sizes 238" and "VIF kernel sizes 238(1)-238(4)." In some embodiments, the VIF kernel sizes 238(1)-230(4) correspond to the scaling indices 1-4, respectively. In the same or other embodiments, the VIF kernel sizes 238(1)-230(4) inherently define the NVD-specific spatial scales corresponding to $NVD\_VIF_1$, $NVD\_VIF_2$, $NVD\_VIF_3$, $NVD\_VIF_4$, respectively, for the NVD 124(3).

The VIF kernel sizing engine 230 can determine the VIF kernel sizes 238(1)-238(4) in any technically feasible fashion that is consistent with the VIF index. In some embodiments, the VIF kernel sizing engine 230 implements the following equation to compute a VIF kernel size (denoted as K) corresponding to an NVD and a VIF scale index (denoted as idx):

$$K = \text{roundUpToOdd}((2^{(5-\text{idx})}+1)*NVD/3.0) \quad (3)$$

As shown, in some embodiments, the VIF kernel sizing engine 230 computes the VIF kernel sizes 238(1)-238(4) based on scale indices of 1-4, respectively. and the NVD 124(3). For instance, in some embodiments, the VIF kernel sizing engine 230 computes the VIF kernel sizes 238(1)-238(4) of 27, 15, 9, and 5, respectively, based on an exemplary value of 4.5 (depicted in italics) for NVD 124(3).

Notably, as per equation (3), as an NVD varies, each of the VIF kernel sizes 238 varies in the same direction. And as persons skilled in the art will recognize, as each VIF kernel size 238 varies, a degree of smoothing associated with both the filtered reconstructed image and the filtered source image varies in the same direction. Accordingly, $NVD\_VIF_1$, $NVD\_VIF_2$, $NVD\_VIF_3$, and $NVD\_VIF_4$ accurately reflect that, within the ranges of actual NVDs commonly associated with actual viewing experiences, as the actual NVD increases, distortions in reconstructed frames become less apparent to the viewer, In some embodiments, the VIF engine 240(1)-the VIF engine 240(4) are different instances of a VIF engine 240 (not explicitly shown) that configure one or more instances of the VIF extractor 250 to compute $NVD\_VIF_1$ values, $NVD\_VIF_2$ values, $NVD\_VIF_3$ values, and $NVD\_VIF_4$ values, respectively. As shown, in some embodiments, the VIF engine 240(1) computes an $NVD\_VIF_1$ value 252(1)-an $NVD\_VIF_1$ value 252(F) based on the VIF kernel size 238(1), the reconstructed frames 172(1)-172(F), and the source frames 162(1)-162(F). In the same or other embodiments, the VIF engine 240(2) computes an $NVD\_VIF_2$ value 254(1)-an $NVD\_VIF_2$ value 254(F) based on the VIF kernel size 238(2), the reconstructed frames 172(1)-172(F), and the source frames 162(1)-162(F). In some embodiments, the VIF engine 240(3) computes an $NVD\_VIF_3$ value 256(1)-an $NVD\_VIF_3$ value 256(F) based on the VIF kernel size 238(3), the reconstructed frames 172(1)-172(F), and the source frames 162(1)-162(F). In the same or other embodiments, the VIF engine 240(4) computes an $NVD\_VIF_4$ value 258(1)-an $NVD\_VIF_4$ value 258(F) based on the VIF kernel size 238(4), the reconstructed frames 172(1)-172(F), and the source frames 162(1)-162(F).

For explanatory purposes, the functionality of the VIF engine 240 is described herein in the context of the VIF engine 240(1). As shown, in some embodiments, the VIF engine 240(1) includes, without limitation, a VIF extractor 250(1)-a VIF extractor 250(F). The VIF extractor 250(1)-the VIF extractor 250(F) are different instances of the VIF extractor 250. As noted previously herein, the VIF extractor 250 computes a VIF value based on a reconstructed frame, a corresponding source frame, and a VIF kernel size that inherently defines an NVD-specific spatial scale. The VIF extractor 250 is described in greater detail below in conjunction with FIG. 3, As shown, in some embodiments, the VIF engine 240(1) configures the VIF extractor 250(1)-the VIF extractor 250 (F) to concurrently compute the $NVD\_VIF_1$ value 252(1)-the $NVD\_VIF_1$ value 252(F), respectively, based on the VIF kernel size 238(1), the reconstructed frames 172(1)-172(F), respectively, and the source frames 162(1)-162(F), respectively. More generally, in some embodiments, the VIF engine 240(1) can configure any number of instances of the VIF extractor 250 to compute the $NVD\_VIF_1$ value 252(1)-the $NVD\_VIF_1$ value 252(F) concurrently, sequentially, or in any combination thereof.

The feature denoted PPD_DLM is a PPD-aware Detail Loss Metric (DLM). As persons skilled in the art will recognize, the DLM is part of an image quality metric known as the "additive distortion metric" ("ADM"). The ADM is based on a premise that humans respond differently to detail losses in a distorted image and additive impairments in the distorted image. As used herein, "detail losses" refer to losses of useful visual information in a distorted image relative to a corresponding reference image. Detail losses can negatively impact content visibility and therefore perceptual visual quality. As used herein, "additive impairments" refer to redundant visual information that is present in the distorted image but not in the corresponding reference image. Additive impairments can be distracting to viewers.

As described in greater detail below in conjunction with FIG. 4, in accordance with the DLM, additive impairments are removed from a distorted image to generate a restored image. A value of DLM that estimates a percentage of perceived visual information losses associated with the distorted image is computed based on estimated responses of the HVS to the restored image and a corresponding reference image. The PPD-aware DLM is a version of a DLM that is modified to account for different PPD values when estimating responses of the HVS to the restored image and a corresponding reference image. As described previously herein, a "PPD" value refers to the number of pixels within each degree of the visual angle of a viewer.

In some embodiments, the feature engine 140(0) computes the PPD value 208 based on the DRH 122(3) and the NVD 124(3) in any technically feasible fashion. As shown, in some embodiments, the feature engine 140(0) implements the following equation to compute the PPD value 208 denoted as PPD based on the DRH 122(3) and the NVD 124(3):

$$PPD = DRH/(\arctan(1/(NVD*2))*360/\pi \quad (4)$$

Notably, as the DRH 122(3) or the NVD 124(3) varies, the PPD value 208 varies in the same direction. And within the ranges of actual PPD values commonly associated with actual viewing experiences, as an actual PPD value increases, detail losses in reconstructed frames become less apparent to viewers, which increases the perceived video quality of the reconstructed frames. Unlike values of conventional versions of the DLM that are associated with some conventional perceptual quality models, PPD_DLM values are computed based on corresponding PPD values and corresponding NVDs.

In some embodiments, the PPD-aware DLM extractor 260(1)-the PPD-aware DLM extractor 260(F) are different instances of a PPD-aware DLM extractor 260 (not explicitly shown) that compute PPD_DLM value 268(1)-PPD_DLM value 268(F), respectively. The PPD-aware DLM extractor 260(1) is described in greater detail below in conjunction with FIG. 4.

For explanatory purposes, the PPD-aware DLM extractor 260(1)-the PPD-aware DLM extractor 260(F) are also referred to herein collectively as "PDD-aware DLM extractors 260(1)-260(F)." The PPD_DLM value 268(1)-PPD_DLM value 268(F) are also referred to herein collectively as "PPD_DLM values" and "PPD_DLM values 268(1)-268(F)."

As shown, in some embodiments, the feature engine 140(0) configures the PPD-aware DLM extractors 260(1)-260(F) to concurrently compute the PPD_DLM values 268(1)-268(F), respectively, based on the PPD value 208, the NVD 124(3), the reconstructed frames 172(1)-172(F), respectively, and the source frames 162(1)-162(F), respectively. More generally, in some embodiments, the feature engine 140(0) can configure any number of instances of the PPD-aware DLM extractor 260 to compute the PPD_DLM values 268(1)-268(F) concurrently, sequentially, or in any combination thereof.

The feature denoted TI is a temporal information metric that captures the amount of motion that is present in a scene and is quantified by differences between adjacent pairs of the source frames 162 included in the source video sequence 160. Values for TI are also referred to herein as "TI values."

As shown, in some embodiments, the TI extractor 270 computes TI value 278(1)-TI value 278(F) based on the source video sequence 160. The TI extractor 270 can quantify differences between adjacent pairs of the source frames 162 in any technically feasible fashion. In some embodiments, the TI extractor 270 performs any amount and/or types of filtering on the source frames 162 to generate filtered source frames (not shown). The TI extractor 270 then sets each TI value equal to the average absolute pixel difference for the luminance component between a corresponding adjacent pair of filtered source frames.

In some embodiments, the feature engine 140(0) generates the feature vectors 182 based on the ordering of the features within the feature set 202. As shown, in some embodiments, the feature engine 140(0) generates the feature vector 182(1) that includes, sequentially and without limitation, the $NVD\_VIF_1$ value 252(1), the $NVD\_VIF_2$ value 254(1), $NVD\_VIF_3$ value 256(1), the $NVD\_VIF_4$ value 258(1), the PPD_DLM value 268(1), and the TI value 278(1). Similarly, the feature engine 140(0) generates the feature vector 182(F) that includes, sequentially and without limitation, the $NVD\_VIF_1$ value 252(F), the $NVD\_VIF_2$ value 254(F), $NVD\_VIF_3$ value 256(F), the $NVD\_VIF_4$ value 258(F), the PPD_DLM value 268(F), and the TI value 278(F). Although not shown, the feature engine 140(0) generates the feature vector 182(i), for i is an integer from 2 to (F−1), that includes, sequentially, and without limitation, the $NVD\_VIF_1$ value 252(i), the $NVD\_VIF_2$ value 254(i), $NVD\_VIF_3$ value 256(i), the $NVD\_VIF_4$ value 258(i), the PPD_DLM value 268(i), and the TI values 278(i). The feature engine 140(0) then outputs the feature vectors 182(1)-182(F).

Figure 3:
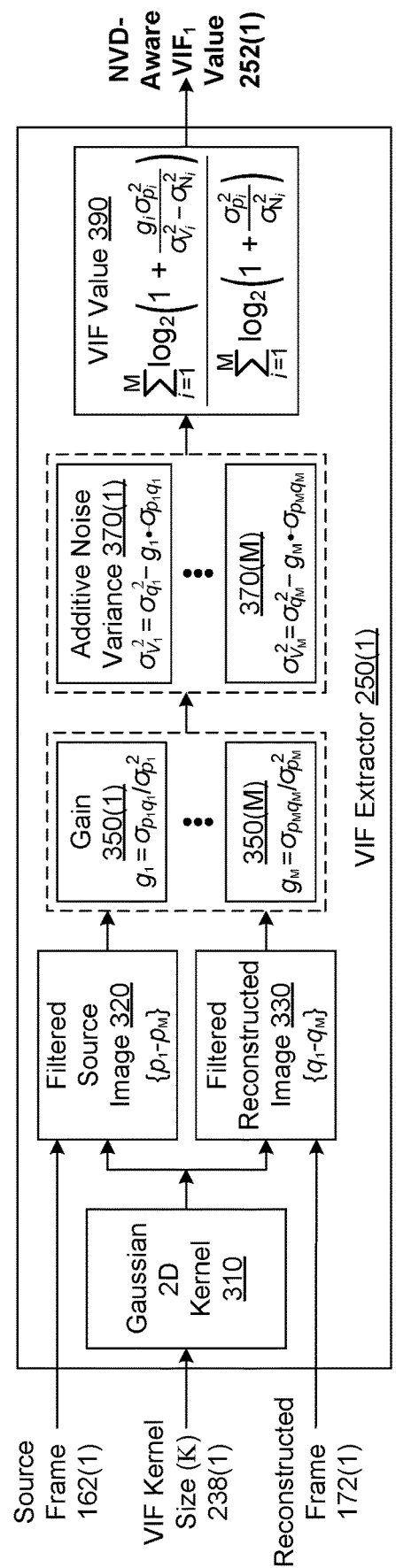
FIG. 3 is a more detailed illustration of one of the Visual Information Fidelity (VIF) extractors of FIG. 2, according to various embodiments.

FIG. 3 is a more detailed illustration of one of the VIF extractors 250 of FIG. 2, according to various embodiments. For explanatory purposes, the functionality of the VIF extractor 250 that implements NVD_VIF in some embodiments is described in conjunction with FIG. 3 in the context of the VIF extractor 250(1) of FIG. 2. The VIF extractor 250(1) is an instance of the VIF extractor 250 that computes the $NVD\_VIF_1$ value 252(1) based on the VIF kernel size 238(1), the source frame 162(1), and the reconstructed frame 172(1).

As described previously herein in conjunction with FIG. 2, the VIF kernel size 238(1) corresponds to both a VIF scale index of 1 and the NVD 124(3). More generally, in some embodiments, any number of instances of the VIF extractor 250 can be configured to compute NVD-aware VIF values for any number of reconstructed frames based on any number of VIF kernel sizes corresponding to any number of combinations of scale indices and NVDs.

In some embodiments, the VIF extractor 250(1) implements a pixel-domain version of the VIF index to compute the $NVD\_VIF_1$ value 252(1) corresponding to the reconstructed frame 172(1) based on the reconstructed frame 172(1), the source frame 162(1), and the VIF kernel size 238(1). More precisely, in the same or other embodiments, the VIF extractor 250(1) computes the $NVD\_VIF_1$ value 252(1) based on an estimated amount of human-perceivable information that is shared between the source frame 162(1) and the reconstructed frame 172(1) at a spatial scale defined by the VIF kernel size 238(1). As shown, in some embodiments, the VIF extractor 250(1) includes, without limitation, a Gaussian 2D kernel 310, a filtered source image 320, a filtered reconstructed image 330, a gain 350(1)-a gain 350(M), an additive noise variance 370(1)-an additive noise variance 370(M), and a VIF value 390.

In some embodiments, the VIF extractor 250(1) generates the Gaussian 2D kernel 310 that has rotational symmetry based on the VIF kernel size 238(1). In the context of FIG. 3, the VIF kernel size 238(1) is denoted as K. The VIF extractor 250(1) can generate the Gaussian 2D kernel 310 in any technically feasible fashion. In some embodiments, the VIF extractor 250(1) generates the Gaussian 2D kernel 310 based on a Gaussian 1D kernel having a size of K and a standard deviation of (K/5.0).

In some embodiments, the VIF extractor 250(1) computes the 2D convolution of the source frame 162(1) with the Gaussian 2D kernel 310 to generate the filtered source image 320. The pixels of the filtered source image 320 are denoted herein as $p_1$-$p_M$, where M denotes the number of pixels in the filtered source image 320. As also shown, in some embodiments, the VIF extractor 250(1) computes the 2D convolution of the reconstructed frame 172(1) with the Gaussian 2D kernel 310 to generate the filtered reconstructed image 330. The pixels of the reconstructed image 330 are denoted herein as $q_1$-$q_M$.

Advantageously, as persons skilled in the art will recognize, a degree of smoothing associated with both the filtered source image 320 and the filtered reconstructed image 330 corresponds to the VIF kernel size 238(1). And, referring back to FIG. 2, in some embodiments, the VIF kernel size 238(1) is computed based on the NVD 124(3). Accordingly, for the VIF scale index of 1, the VIF kernel size 238(1) enables the VIF extractor 250(1) to approximate the human-perceived visibility of distortions associated with the reconstructed image when viewed at the NVD 124(3).

In some embodiments, the VIF extractor 250(1) models distortion associated with the filtered reconstructed image 330 as signal gain and additive Gaussian noise having a mean of zero and an additive noise variance. The gain 350(1)-the gain 350(M) are local estimates of the signal gain associated with the filtered reconstructed image 330. The additive noise variance 370(1)-the additive noise variance 370(M) are local estimates of the additive noise variance associated with the filtered reconstructed image 330.

For explanatory purposes, the gain 350(1)-the gain 350(M) are denoted herein as $g_1$-$g_M$, respectively. In some embodiments, the VIF extractor 250(1) estimates the gain 350(1)-the gain 350(M) based on the filtered source image 320 and the filtered reconstructed image 330. The VIF extractor 250(1) can estimate the gain 350(1)-the gain 350(M) in any technically feasible fashion. As shown, in some embodiments, the VIF extractor 250(1) implements the following equation to estimate the gain 350(1)-the gain 350(M) corresponding to values 1-M, respectively, for an integer variable i;

$$g_i = g_{p_i q_i} / \sigma_{p_i}^2 \quad (5)$$

For explanatory purposes, the additive noise variance 370(1)-the additive noise variance 370(M) are denoted herein as $\sigma_{V_1}^2$-$\sigma_{V_M}^2$, respectively. In some embodiments, the VIF extractor 250(1) estimates the additive noise variance 370(1)-the additive noise variance 370(M) based on the gain 350(1)-the gain 350(M), respectively, the filtered source image 320, and the filtered reconstructed image 330.

The VIF extractor 250(1) can estimate the additive noise variance 370(1)-the additive noise variance 370(M) in any technically feasible fashion. As shown, in some embodiments, the VIF extractor 250(1) implements the following equation to estimate the additive noise variance 370(1)-the additive noise variance 370(M) corresponding to values 1-M, respectively, for an integer variable i:

$$\sigma_{V_i}^2 = \sigma_{q_i}^2 - g_i \cdot \sigma_{p_i q_i} \quad (6)$$

In some embodiments, to compute the NVD_VIF$_1$ value 252(1), the VIF extractor 250(1) estimates a fraction of the information in the filtered source image 320 that the HVS can extract from the filtered reconstructed image 330. In the same or other embodiments, the VIF extractor 250(1) compute the NVD_VIF$_1$ value 252(1) based on the gain 350(1)- the gain 350(M), the additive noise variance 370(1)-the additive noise variance 370(M), and additive white Gaussian noise that models uncertainty in the perception of visual signals associated with the HVS. In some embodiments, the additive white Gaussian noise has a variance that is a constant value (e.g., 2.0) and is denoted herein as $\sigma_N^2$. As shown, in the same or other embodiments, the VIF extractor 250(1) implements the following equation to compute the NVD_VIF$_1$ value 252(1) that is the VIF value 390 corresponding to the reconstructed frame 172(1), the VIF scale index of 1, and the NVD 124(3):

$$\text{VIF value} = \frac{\sum_{i=1}^{M} \log_2\left(1 + \frac{g_i^2 \sigma_{p_i}^2}{\sigma_{V_i}^2 + \sigma_N^2}\right)}{\sum_{i=1}^{M} \log_2\left(1 + \frac{\sigma_{p_i}^2}{\sigma_N^2}\right)} \quad (7)$$

Figure 4:
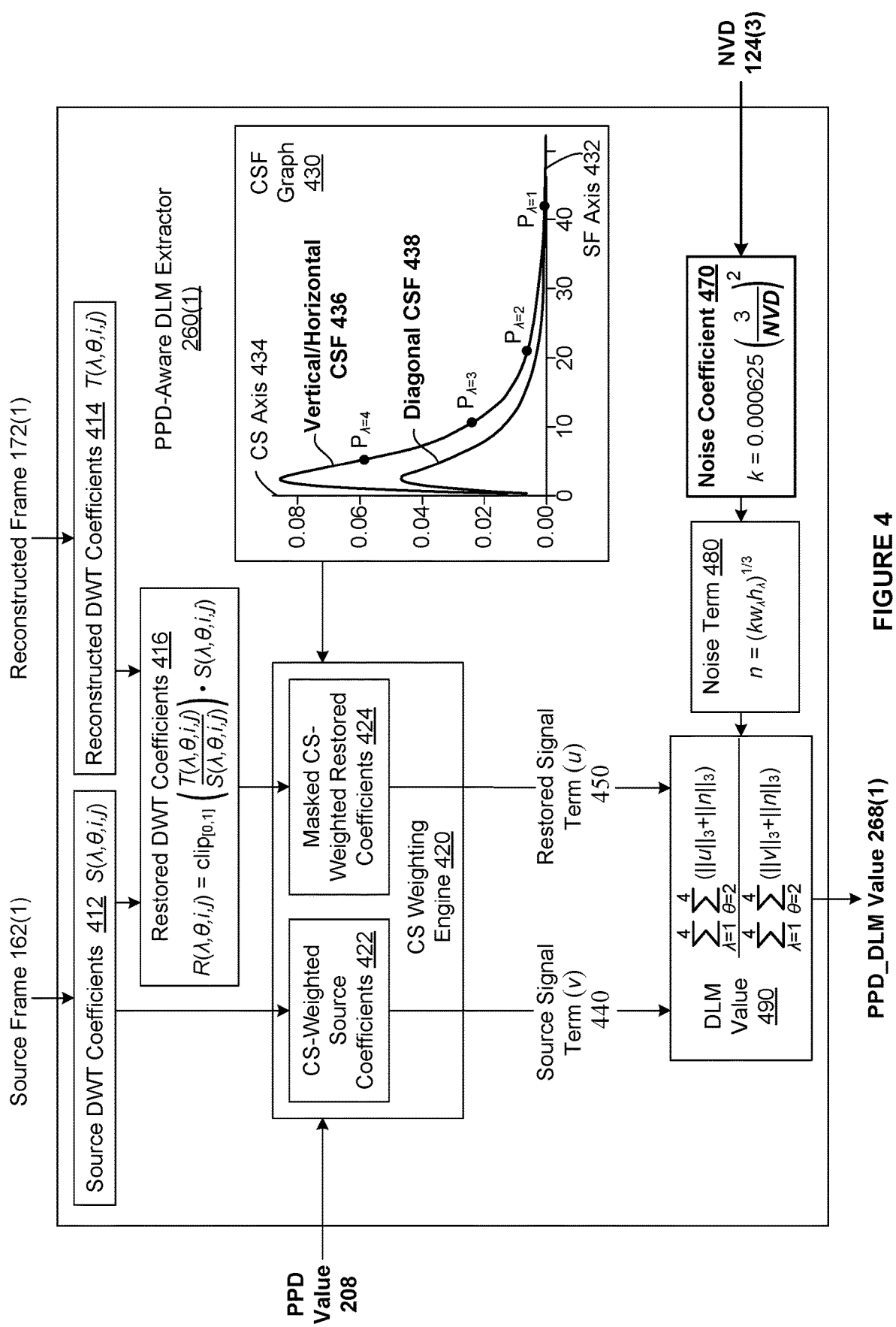
FIG. 4 is a more detailed illustration of one of the PPD-aware detail loss metric (DLM) extractors of FIG. 2, according to various embodiments.

FIG. 4 is a more detailed illustration of one of the PPD-aware DLM extractors 260 of FIG. 2, according to various embodiments. For explanatory purposes, the functionality of the PPD-aware DLM extractor 260 that implements PPD_DLM in some embodiments is described in conjunction with FIG. 4 in the context of the PPD-aware DLM extractor 260(1) of FIG. 2.

The PPD-aware DLM extractor 260(1) is an instance of the PPD-aware DLM extractor 260 that computes the PPD_ DLM value 268(1) based on the PPD value 208, the DRH 122(3), the reconstructed frame 172(1), and the source frame 162(1). More generally, in some embodiments, any number of instances of the PPD-aware DLM extractor 260 can be configured to compute PPD_DLM values for any number of reconstructed frames based on any combination of PPD values and NVDs.

In some embodiments, the PPD-aware DLM extractor 260(1) implements a version of the DLM that operates in the wavelet domain and is modified to account for different PPD values. As shown, in the same or other embodiments, the PPD-aware DLM extractor 260(1) includes, without limitation, source discrete wavelet transform (DWT) coefficients 412, reconstructed DWT coefficients 414, restored DWT coefficients 416, a contrast sensitivity (CS) weighting engine 420, a contrast sensitivity function (CSF) graph 430, a noise coefficient 470, a noise term 480, and a DLM value 490.

In some embodiments, the PPD-aware DLM extractor 260(1) uses 4-scale Daubechies db2 wavelets, where db2 indicates that the number of vanishing moments is 2, to compute source DWT coefficients 412 and reconstructed DWT coefficients 414 based on the source frame 162(1) and the reconstructed frame 172(1), respectively. In some other embodiments, the PPD-aware DLM extractor 260(1) can use any type of technically feasible wavelets (e.g., biorthogonal wavelets). For explanatory purposes only, the source DWT coefficients 412 are also referred to herein individually as "the source DWT coefficient 412." And the reconstructed DWT coefficients 414 are also referred to herein individually as "the reconstructed DWT coefficient 414."

In some embodiments, the PPD-aware DLM extractor 260(1) decomposes the reconstructed frame 172(1) into a restored image (not shown) and an additive image (not shown) based on the source DWT coefficients 412 and the reconstructed DWT coefficients 414. The reconstructed frame 172(1) is equal to the sum of the restored image and the additive image. The restored image includes the same detail losses as the reconstructed frame 172(1) but does not include any additive impairments. To determine the restored image, the PPD-aware DLM extractor 260(1) can compute restored DWT coefficients 416 for the restored image in any technically feasible fashion. The restored DWT coefficients 416 are also referred to herein individually as "the restored DWT coefficient 416."

For explanatory purposes, $S(\lambda,\theta,i,j)$, $T(\lambda,\theta,i,j)$, and $R(\lambda,\theta,i,j)$ denote the source DWT coefficient 412, the reconstructed DWT coefficient 414, and the restored DWT coefficient 416, respectively, for a two-dimensional location (i,j) in a subband having a subband index of $\theta$ of a DWT scale having a DWT scale index of $\lambda$. In some embodiments, the DWT scale index $\lambda$ is a value from 1-4, where each of the DWT scale indices 1-4 denotes a different one of the four scales associated with the Daubechies db2 wavelets.

In some embodiments, the subband index $\theta$ is a value from 1 to 4, where the subband index 1 denotes an approximation subband, the subband index 2 denotes a vertical subband, the subband index 3 denotes a diagonal subband, and the subband index 4 denotes a horizontal subband. Notably, the PPD-aware DLM extractor 260(1) does not use the restored DWT coefficients 416 for the approximation subband (denoted as subband index $\theta$ of 1) to compute the PPD_DLM value 268(1). Accordingly, in some embodiments, the PPD-aware DLM extractor 260(1) does not compute the restored DWT coefficients 416 $R(\lambda,1,i,j)$.

As shown, in some embodiments, the PPD-aware DLM extractor 260(1) computes the restored DWT coefficient 416 $R(\lambda,\theta,i,j)$ for each 2-D location in each of the vertical, diagonal, and horizontal subbands having subband indices 2-4, respectively, of each of the four scales based on the following equation:

$$R(\lambda,\theta,i,j)=\text{clip}_{[0,1]}(T(\lambda,\theta,i,j)/S(\lambda,\theta,i,j))\cdot S(\lambda,\theta,i,j) \qquad (8)$$

As shown, in some embodiments, the CS weighting engine 420 generates a source signal term 440 and a restored signal term 450 based on source DWT coefficients 412 and the restored DWT coefficients 416, respectively, the PPD value 208, a vertical/horizontal CSF 436, and a diagonal CSF 438. The source signal term 440 and the restored signal term 450 are also denoted herein as u and v, respectively.

For explanatory purposes, as used herein, a "contrast level" refers to a relative difference in luminance, a "contrast threshold" is the lowest contrast level of an object that is required for a typical person to detect the object, and a "contrast sensitivity" is the reciprocal of contrast threshold. As used herein, a "spatial frequency" refers to the number of cycles or line pairs (e.g. a black line and a white line in a grating of alternating black and white lines) that fall within one degree of visual angle. In some embodiments, spatial frequency is measured in cycles per degree. Spatial frequency is also denoted herein as "SF."

As used herein, a "CSF" describes a relationship between spatial frequency and contrast sensitivity of the HVS. In some embodiments, the vertical/horizontal CSF 436 describes a relationship between spatial frequency and contrast sensitivity of the HVS to vertical and horizontal structures. The vertical/horizontal CSF 436 is therefore associated with both a vertical direction and a horizontal direction. In the same or other embodiments, the diagonal CSF 438 describes a relationship between spatial frequency and contrast sensitivity of the HVS to diagonal structures. The diagonal CSF 438 is therefore associated with a diagonal direction.

For explanatory purposes, the CSF graph 430 depicts the vertical/horizontal CSF 436 and the diagonal CSF 438 that the PPD-aware DLM extractor 260(1) implements in some embodiments with respect to a spatial frequency (SF) axis 432 and a contrast sensitivity (CS) axis 434. As graphically illustrated by the vertical/horizontal CSF 436 and the diagonal CSF 438, the contrast sensitivity of the HVS to vertical and horizontal structures at a given spatial frequency is higher than the contrast sensitivity of the HVS to diagonal structures at the spatial frequency. In some embodiments, the diagonal CSF 438 is a scaled version of the vertical/horizontal CSF 436. As referred to herein, in a "scaled version" of the vertical/horizontal CSF 436, the contrast sensitivities of the vertical/horizontal CSF 436 are reduced by a global scale factor, while the functional shape of the vertical/horizontal CSF 436 is retained.

In some embodiments, the vertical/horizontal CSF 436 and the diagonal CSF 438 are modified versions of a conventional CSF (e.g., the Barten CSF) that have been tuned to better correlate with empirical results. Advantageously, in some embodiments, the vertical/horizontal CSF 436 and the diagonal CSF 438 accurately represent contrast sensitivity across spatial frequencies that are associated with most viewing experiences.

In some embodiments, the CS weighting engine 420 computes a different nominal spatial frequency (not shown) for each of the four DWT scales based, at least in part, on the PPD value 208. The CS weighting engine 420 can compute the nominal spatial frequencies in any technically feasible fashion. For instance, in some embodiments, the CS weighting engine 420 can compute the nominal spatial frequencies based on the DWT scale indices, the PPD value 208, and a number of cycles per picture height or a number of line pairs per picture height. As used herein, "picture height" refers to the physical height of a display screen.

In some embodiments, for each DWT scale, the CS weighting engine 420 maps the nominal spatial resolution associated with the DWT scale to a vertical/horizontal contrast sensitivity associated with the DWT scale via the vertical/horizontal CSF 436. In the same or other embodiments, for each DWT scale, the CS weighting engine 420 maps the nominal spatial resolution associated with the DWT scale to a diagonal contrast sensitivity associated with the DWT scale via the diagonal CSF 438. For explanatory purposes, exemplary points $P_{\lambda=1}-P_{\lambda=4}$ that are depicted along the vertical/horizontal CSF 436 illustrate mappings, in some embodiments, of nominal spatial resolutions to vertical/horizontal contrast sensitivities for DWT scales having the DWT scale indices of 1-4, respectively.

In some embodiments, the CS weighting engine 420 discards the source DWT coefficients 412 $S(\lambda,1,i,j)$ in the approximation band and multiples each of the remaining source DWT coefficients by a corresponding contrast sensitivity to generate CS-weighted source coefficients 422. For each source DWT coefficient 412 $S(\lambda,2,i,j)$ in the vertical subband and each source DWT coefficient 412 $S(\lambda,4,i,j)$ in the horizontal subband, the corresponding contrast sensitivity is the vertical/horizontal contrast sensitivity associated with the DWT scale having the DWT scale index of $\lambda$. For each source DWT coefficient 412 $S(\lambda,3,i,j)$ in the diagonal subband, the corresponding contrast sensitivity is the diagonal contrast sensitivity associated with the DWT scale having the DWT scale index of $\lambda$.

In some embodiments, the CS weighting engine 420 discards the restored DWT coefficients 416 $R(\lambda,1,i,j)$ in the approximation band and multiples each of the remaining restored DWT coefficients by a corresponding contrast sensitivity to generate CS-weighted restored coefficients (not shown). For each restored DWT coefficient 416 $R(\lambda,2,i,j)$ in the vertical subband and each restored DWT coefficient 416 $R(\lambda,4,i,j)$ in the horizontal subband, the corresponding contrast sensitivity is the vertical/horizontal contrast sensitivity associated with the DWT scale having the DWT scale index of $\lambda$. For each restored DWT coefficient 416 $R(\lambda,3,i,j)$ in the diagonal subband, the corresponding contrast sensitivity is the diagonal contrast sensitivity associated with the DWT scale having the DWT scale index of $\lambda$.

Notably, the CS-weighted source coefficients 422 and the CS-weighted restored coefficients estimate responses of the HVS to the source frame 162(1) and the restored image, respectively, that account for the PPD value 208. In some embodiments, the CS weighting engine 420 sets the source signal term 440 equal to a subset of the CS-weighted source coefficients 422 that are in a center region of each subband with a border factor (e.g., 0.1).

In some embodiments, the CS weighting engine 420 performs one or more contrast masking operations on the CS-weighted restored coefficients, thereby mitigating any impact of the additive image on the visibility of the restored image, to generate the masked CS-weighed restored coefficients 424. The CS weighting engine 420 sets the restored signal term 450 equal to a subset of the masked CS-weighted restored coefficients 424 that are in a center region of each subband with a border factor (e.g., 0.1).

As shown, in some embodiments, the PPD-aware DLM extractor 260(1) computes the DLM value 490 as per the following equation:

$$DLM\ value = \frac{\sum_{\lambda=1}^{4}\sum_{\theta=2}^{4}(\|u\|_3 + \|n\|_3)}{\sum_{\lambda=1}^{4}\sum_{\theta=2}^{4}(\|v\|_3 + \|n\|_3)} \qquad (9)$$

In equation (9), v, u, and n denote the source signal term 440, the restored signal term 450, and the noise term 480, respectively, and $\|\ \|_3$ denotes a 3-norm operation. As per the summation signs in equation (9), the PPD-aware DLM extractor 260(1) independently sums the numerator and the denominator over the vertical, horizontal, and diagonal subbands, and then over the four scales. As shown, the PPD-aware DLM extractor 260(1) outputs the DLM value 490 as the PPD_DLM value 168(1)

As persons skilled in the art will recognize, equation (9) is a ratio of the restored signal term 450 regularized by the noise term 480 and the source signal term 440 regularized by the noise term 480. Accordingly, to enable accurate detection of perceived visual information losses associated with the restored signal term 440 via equation (9) over different viewing parameters, the PPD-aware DLM extractor 260(1) takes into account the NVD 124(3) when computing the noise term 480. As shown, in some embodiments, the PPD-aware DLM extractor 260(1) computes the noise coefficient 470 (denoted herein as k) based on the NVD 124(3) as per the following equation:

$$k=0.000625(3/NVD)^2 \qquad (12)$$

As shown, in the same or other embodiments, the PPD-aware DLM extractor 260(1) defines the noise term 480 as $n=(kw_\lambda h_\lambda)^{1/3}$. In the noise term 480, $w_\lambda$ and $h_\lambda$ denote the width and height, respectively, of the DWT scale having the DWT scale index of $\lambda$, and k denotes the noise coefficient 470.

Figure 5:
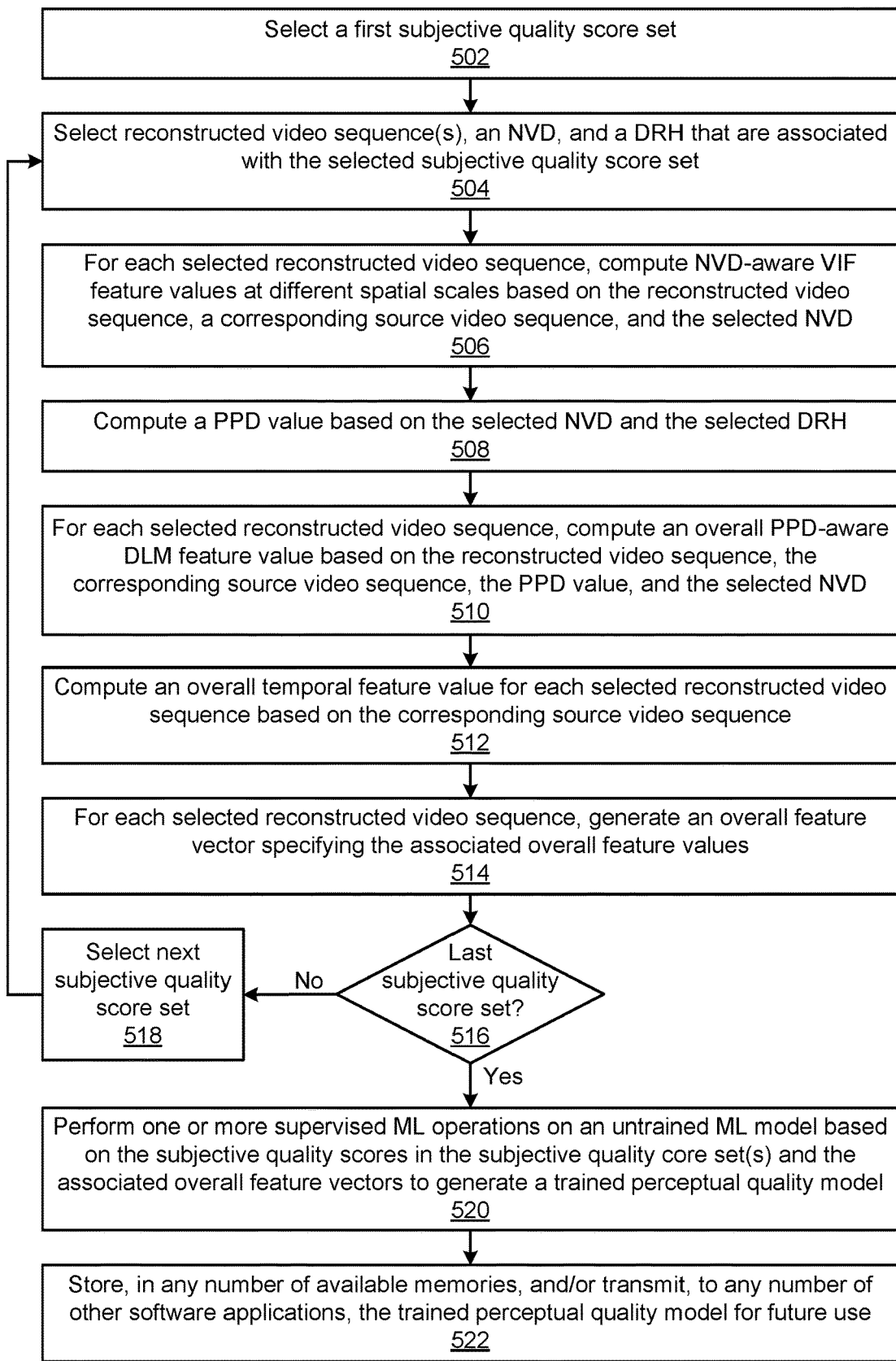
FIG. 5 is a flow diagram of method steps for generating a trained perceptual quality model that accounts for an NVD and a display resolution, according to various embodiments.

FIG. 5 is a flow diagram of method steps for generating a trained perceptual quality model that accounts for an NVD and a display resolution, according to various embodiments. Although the method steps are described with reference to the systems of FIGS. 1-4, persons skilled in the art will understand that any system configured to implement the method steps, in any order, falls within the scope of the embodiments.

As shown, a method 500 begins at step 502, where the training application 130 selects the subjective quality score set 102(2). At step 504, the training application 130 selects reconstructed video sequence(s), an NVD, and a DRH that are associated with the selected subjective quality score set.

At step 506, for each selected reconstructed video sequence, the feature engine 140 computes overall NVD-aware VIF feature values at different spatial scales based on the reconstructed video sequence, a corresponding source video sequence, and the selected NVD.

At step 508, the feature engine 140 computes a PPD value based on the selected NVD and the selected DRH. At step 510, for each selected reconstructed video sequence, the feature engine 140 computes an overall PPD-aware DLM feature value based on the reconstructed video sequence, the corresponding source video sequence, the PPD value, and the selected NVD.

At step 512, the feature engine 140 computes an overall temporal feature value for each selected reconstructed video sequence based on the corresponding source video sequence. At step 514, for each selected reconstructed video sequence, the feature engine 140 generates an overall feature vector specifying the associated overall feature values.

At step 516, the training application 130 determines whether the selected subjective quality score set is the last subjective quality score set. If, at step 516, the training application 130 determines that the selected subjective quality score set is not the last subjective quality score set, the method 500 proceeds to step 518. At step 518, the training application 130 selects the next subjective quality score set, and the method 500 returns to step 504, where the training application 130 selects reconstructed video sequence(s), an NVD, and a DRH that are associated with the selected subjective quality score set.

If, however, at step 516, the training application 130 determines that the selected subjective quality score set is the last subjective quality score set, then the method 500 proceeds directly to step 520. At step 520, the training engine 150 performs one or more supervised machine learning (ML) operations on an untrained ML model based on the subjective quality scores in the subjective quality core set(s) and the associated overall feature vectors to generate the trained perceptual quality model 158.

At step 522, the training engine 150 stores, in any number of available memories, and/or transmits, to any number of other software applications, the trained perceptual quality model 158 for future use. The method 500 then terminates.

Figure 6:
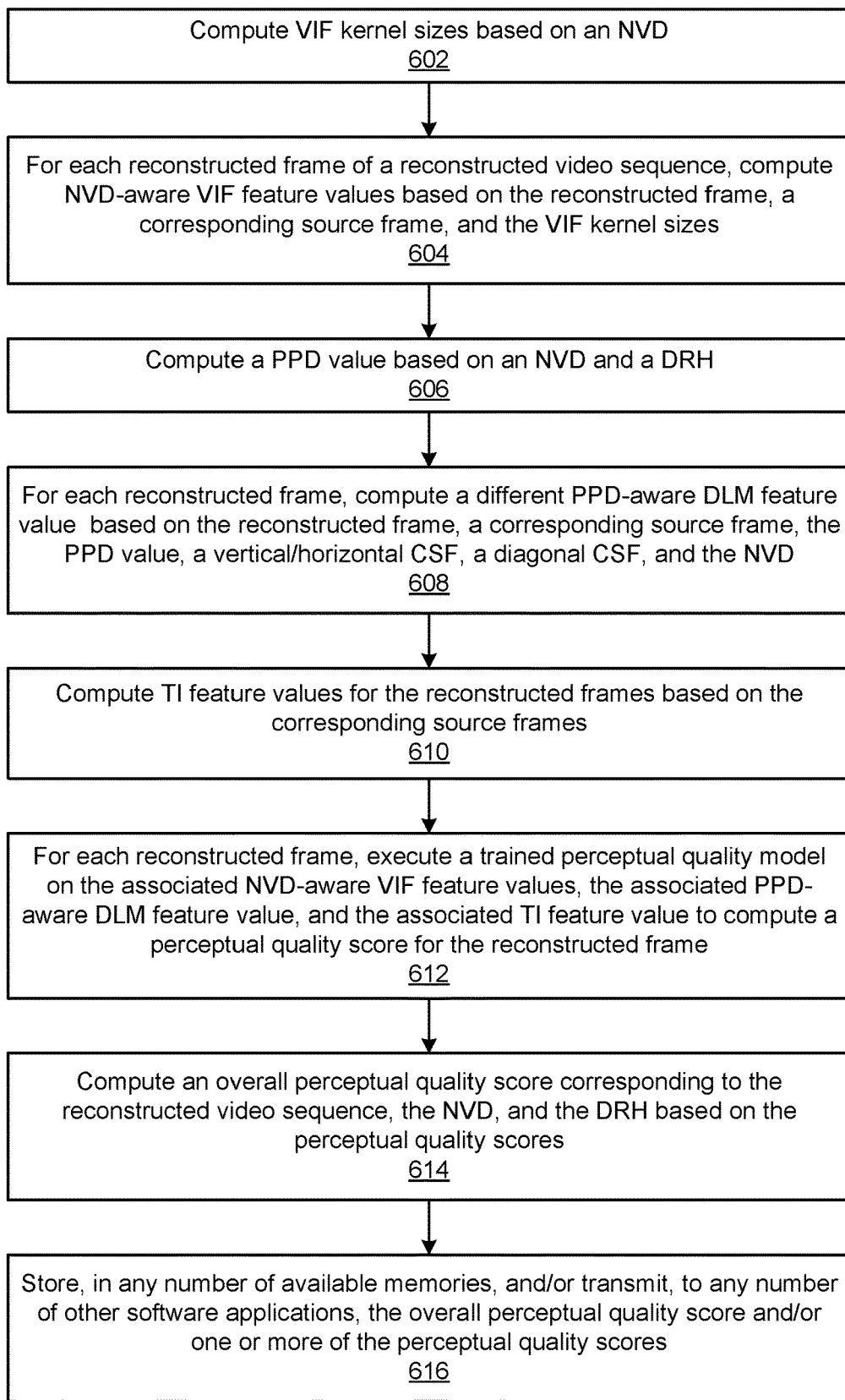
FIG. 6 is a flow diagram of method steps for estimating the perceptual video quality of a reconstructed video using a trained perceptual quality model, according to various embodiments.

FIG. 6 is a flow diagram of method steps for estimating the perceptual video quality of a reconstructed video using a trained perceptual quality model, according to various embodiments. Although the method steps are described with reference to the systems of FIGS. 1-4, persons skilled in the art will understand that any system configured to implement the method steps, in any order, falls within the scope of the embodiments.

As shown, a method 600 begins at step 602, where the feature engine 140 computes multiple VIF kernel sizes based on an NVD. At step 604, for each reconstructed frame of a reconstructed video sequence, the VIF extractor 250 computes NVD-aware VIF feature values based on the reconstructed frame, a corresponding source frame, and the VIF kernel sizes.

At step 606, the feature engine 140 computes a PPD value based on an NVD and a DRH. At step 608, for each reconstructed frame, the PPD-aware DLM extractor 260 computes a different PPD-aware DLM feature value based on the reconstructed frame, a corresponding source frame, the PPD value, a vertical/horizontal CSF, a diagonal CSF, and the NVD.

At step 610, the TI extractor 270 computes TI features for the reconstructed frames based on the corresponding source frames. At step 612, for each reconstructed frame, the quality inference application 180 executes trained perceptual quality model 158 on the associated NVD-aware VIF feature values, the associated PPD-aware DLM feature value, and the associated TI feature value to compute a perceptual quality score for the reconstructed frame.

At step 614, the quality inference application 180 computes an overall perceptual quality score corresponding to the reconstructed video sequence, the NVD, and the DRH based on the perceptual quality scores. At step 616, the quality inference application 180 stores, in any number of available memories, and/or transmits, to any number of other software applications, the overall perceptual quality score and/or one or more of the perceptual quality scores for future use. The method 600 then terminates.

In sum, the disclosed techniques can be used to accurately predict human perception of the quality of reconstructed video content across different combinations of DRHs and NVDs via a trained perceptual quality model. In some embodiments, a training application generates feature vectors corresponding to two subjective quality score sets that are associated with different combinations of DRH and NVD. Each subjective quality score is associated with a reconstructed video sequence, a source video sequence, and one of the combinations of DRH and NVD.

The training application includes, without limitation, a feature engine, a feature pooling engine, and a training engine. For each subjective quality score, the feature engine generates a different feature vector for each reconstructed frame in the associated reconstructed video sequence based on the reconstructed frame, a corresponding source frame, an associated DRH, and an associated NVD. In some embodiments, each feature vector includes, without limitation, an $NVD\_VIF_1$ value, an $NVD\_VIF_2$ value, an $NVD\_VIF_3$ value, an $NVD\_VIF_4$ value, a PPD_DLM value, and a TI value.

For each reconstructed frame, the feature engine computes four different VIF filter sizes based on the associated NVD. The feature engine then computes an $NVD\_VIF_1$ value, an $NVD\_VIF_2$ value, an $NVD\_VIF_3$ value, an $NVD\_VIF_4$ value in accordance with a VIF metric based on the reconstructed frame, a corresponding source frame, and a different VIF filter size.

For each reconstructed frame, the feature engine computes a PPD value based on the associated NVD and the associated DRH. The feature engine computes source DWT coefficients in vertical, horizontal, and diagonal subbands of four DWT scales based on a source frame corresponding to the reconstructed frame. The feature engine computes restored DWT coefficients in vertical, horizontal, and diagonal subbands of four DWT scales based on the reconstructed frame and the source frame. The restored DWT coefficients are associated with a restored image that includes the same detail losses as the reconstructed frame but does not include any additive impairments.

The feature engine weights the source DWT coefficients and the restored coefficients in the vertical and horizontal subbands of the four DWT scales based on the PPD value, a vertical/horizontal CSF, and the four DWT scales. The feature engine weights the source DWT coefficients and the restored coefficients in the diagonal subband of the four DWT scales based on the PPD value, a diagonal CSF, and the four DWT scales. The feature extractor scales a noise term based on the NVD. The feature engine then computes a ratio of the weighted restored coefficients regularized by the noise term to the weighted source coefficients regularized by the noise term to generate the PPD_DLM value.

In some embodiments, the feature engine sets each TI value equal to the average absolute pixel difference for the luminance component between a corresponding adjacent pair of reconstructed frames. For each reconstructed video sequence, the feature pooling engine computes a single overall feature vector based on the feature vectors associated with the reconstructed frames in the reconstructed video sequence. In some embodiments, the training engine configures an SVR to train a SVM based on the overall feature vectors and the corresponding subjective quality score sets to generate the trained SVM that is also referred to herein as the trained perceptual quality model.

In some embodiments, a quality inference application uses the trained perceptual quality model to compute an overall perceptual quality score corresponding to a reconstructed video sequence, a DRH, and an NVD. The quality inference application includes, without limitation, the feature engine, the trained perceptual quality model, and a score pooling engine. The feature engine generates a different feature vector for each reconstructed frame of the reconstructed video sequence based on the reconstructed video sequence, a corresponding source video sequence, the DRH, and the NVD. For each reconstructed frame of the reconstructed video sequence, the quality inference application inputs the associated feature vector into the trained perceptual quality model. In response, the trained perceptual quality model outputs a perceptual quality score for the reconstructed frame. The score pooling engine computes an overall perceptual quality score based on the perceptual quality scores for the reconstructed frames. The overall perceptual quality score estimates the perceptual video quality of the reconstructed video sequence when viewed on a display having a digital resolution height equal to the DRH at a normalized viewing distance of the NVD.

At least one technical advantage of the disclosed techniques relative to the prior art is that, with the disclosed techniques, a trained perceptual quality model can be used to predict more accurate perceptual visual quality scores for reconstructed videos across a wider range of viewing parameters relative to what can be achieved using prior art approaches. In particular, unlike features of conventional perceptual quality models, the disclosed techniques incorporate a feature of the trained perceptual quality model that approximates an underlying relationship between PPD values and human perception of reconstructed video content quality. Thus, the trained perceptual quality model can be used to generate different perceptual quality scores for each different combination of display resolution and normalized viewing distance within the ranges of PPD values commonly associated with actual viewing experiences. Accordingly, implementing the trained perceptual quality model in the encoding process can improve the quality/bitrate tradeoffs typically made when encoding video content and, in turn, improve the overall streaming experience for viewers. These technical advantages provide one or more technological advancements over prior art approaches.

1. In some embodiments, a computer-implemented method for estimating perceived video quality for reconstructed video comprises computing a first plurality of feature values corresponding to a plurality of visual quality metrics based on a first reconstructed frame, a first source frame, a first display resolution, and a first normalized viewing distance; executing a trained perceptual quality model on the first plurality of feature values to generate a first perceptual quality score that indicates a first perceived visual quality level for the first reconstructed frame; and performing one or more operations associated with an encoding process based on the first perceptual quality score.

2. The computer-implemented method of clause 1, wherein performing the one or more operations associated with the encoding process comprises computing an overall perceptual quality score for a first reconstructed video sequence that includes the first reconstructed frame based on the first perceptual quality score, wherein the overall perceptual quality score indicates an overall perceived visual quality level for the first reconstructed video sequence; and computing a tradeoff between quality and bitrate based on the overall perceptual quality score when encoding a first source video sequence.

3. The computer-implemented method of clauses 1 or 2, wherein performing the one or more operations associated with the encoding process comprises evaluating at least one of an encoder, a decoder, or an adaptive bitrate streaming algorithm based on the first perceptual quality score.
4. The computer-implemented method of any of clauses 1-3, wherein the first perceived visual quality level approximates the quality of an actual viewing experience where a viewing device has the first display resolution and a viewer views the viewing device at the first normalized viewing distance.
5. The computer-implemented method of any of clauses 1-4, further comprising computing a second plurality of feature values corresponding to the plurality of visual quality metrics based on the first reconstructed frame, the first source frame, the first display resolution, and a second normalized viewing distance; and executing the trained perceptual quality model on the second plurality of feature values to generate a second perceptual quality score that indicates a second perceived visual quality level for the first reconstructed frame.
6. The computer-implemented method of any of clauses 1-5, further comprising computing a first pixels-per-degree value based on the first display resolution and the first normalized viewing distance; and computing an absolute perceptual quality score for a first reconstructed video sequence that includes the first reconstructed frame based on the first perceptual quality score and a first offset associated with the first pixels-per-degree value, wherein the absolute perceptual quality score indicates an overall perceived visual quality level for the first reconstructed video sequence.
7. The computer-implemented method of any of clauses 1-6, wherein the plurality of visual quality metrics comprises at least one of a Detail Loss Metric that is modified to account for different normalized viewing distances and different display resolutions or a Visual Information Fidelity index that is modified to account for different normalized viewing distances.
8. The computer-implemented method of any of clauses 1-7, wherein computing the first plurality of feature values comprises computing a first feature value by computing a pixels-per-degree value based on the first display resolution and the first normalized viewing distance; computing a plurality of contrast sensitivities based on a plurality of scale indices, the pixels-per-degree value, and at least one contrast sensitivity function; and computing the first feature value based on the first reconstructed frame, the first source frame, and the plurality of contrast sensitivities.
9. The computer-implemented method of any of clauses 1-8, wherein computing the first plurality of feature values comprises computing a first feature value by computing a noise coefficient based on the first normalized viewing distance; and computing the first feature value based on the first reconstructed frame, the first source frame, the first display resolution, the first normalized viewing distance, and the noise coefficient.
10. The computer-implemented method of any of clauses 1-9, wherein computing the first plurality of feature values comprises computing a first feature value by generating a Gaussian two-dimensional kernel based on the first normalized viewing distance; and computing the first feature value based on the Gaussian two-dimensional kernel, the first reconstructed frame, and the first source frame.
11. In some embodiments, one or more non-transitory computer readable media include instructions that, when executed by one or more processors, cause the one or more processors to estimate perceived video quality for reconstructed video by performing the steps of computing a first plurality of feature values corresponding to a plurality of visual quality metrics based on a first reconstructed frame, a first source frame, a first display resolution, and a first normalized viewing distance; executing a trained perceptual quality model on the first plurality of feature values to generate a first perceptual quality score that indicates a first perceived visual quality level for the first reconstructed frame; and performing one or more operations associated with an encoding process based on the first perceptual quality score.
12. The one or more non-transitory computer readable media of clause 11, wherein performing the one or more operations associated with the encoding process comprises computing a tradeoff between quality and bitrate based on the first perceptual quality score when encoding a first source video sequence that includes the first source frame.
13. The one or more non-transitory computer readable media of clauses 11 or 12, wherein performing the one or more operations associated with the encoding process comprises computing an overall perceptual quality score for a first reconstructed video sequence that includes the first reconstructed frame based on the first perceptual quality score, wherein the overall perceptual quality score indicates an overall perceived visual quality level for the first reconstructed video sequence; and evaluating at least one of an encoder, a decoder, or an adaptive bitrate streaming algorithm based on the overall perceptual quality score.
14. The one or more non-transitory computer readable media of any of clauses 11-13, wherein the trained perceptual quality model comprises a trained support vector regression model, a trained artificial neural network, or a trained regression tree.
15. The one or more non-transitory computer readable media of any of clauses 11-14, further comprising computing a second plurality of feature values corresponding to the plurality of visual quality metrics based on a second reconstructed frame, a second source frame, a second display resolution, and a second normalized viewing distance; and executing the trained perceptual quality model on the second plurality of feature values to generate a second perceptual quality score that indicates a second perceived visual quality level for the second reconstructed frame.
16. The one or more non-transitory computer readable media of any of clauses 11-15, further comprising computing a first pixels-per-degree value based on the first display resolution and the first normalized viewing distance; and computing an absolute perceptual quality score for a first reconstructed video sequence that includes the first reconstructed frame based on the first perceptual quality score and a first offset associated with the first pixels-per-degree value, wherein the absolute perceptual quality score indicates an overall perceived visual quality level for the first reconstructed video sequence.
17. The one or more non-transitory computer readable media of any of clauses 11-16, wherein the plurality of visual quality metrics comprises at least one of a Detail Loss Metric that is modified to account for different normalized viewing distances and different display resolutions or a Visual Information Fidelity index that is modified to account for different normalized viewing distances.

18. The one or more non-transitory computer readable media of any of clauses 11-17, wherein computing the first plurality of feature values comprises computing a first feature value by computing a pixels-per-degree value based on the first display resolution and the first normalized viewing distance; computing a plurality of contrast sensitivities based on a plurality of scale indices, the pixels-per-degree value, and at least one contrast sensitivity function; and computing the first feature value based on the first reconstructed frame, the first source frame, and the plurality of contrast sensitivities.

19. The one or more non-transitory computer readable media of any of clauses 11-18, wherein computing the first plurality of feature values comprises computing a first feature value by generating a Gaussian two-dimensional kernel based on the first normalized viewing distance; and computing the first feature value based on the Gaussian two-dimensional kernel, the first reconstructed frame, and the first source frame.

20. The one or more non-transitory computer readable media of any of clauses 11-19, wherein the first reconstructed frame is in a High Dynamic Range format.

21. In some embodiments, a system comprises one or more memories storing instructions and one or more processors coupled to the one or more memories that, when executing the instructions, perform the steps of computing a first plurality of feature values corresponding to a plurality of visual quality metrics based on a first reconstructed frame, a first source frame, a first display resolution, and a first normalized viewing distance; executing a trained perceptual quality model on the first plurality of feature values to generate a first perceptual quality score that indicates a first perceived visual quality level for the first reconstructed frame; and performing one or more operations associated with an encoding process based on the first perceptual quality score.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.), or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for estimating perceived video quality for reconstructed video, the method comprising:

computing a first plurality of feature values corresponding to a plurality of visual quality metrics based on a first reconstructed frame, a first source frame, a first display resolution, and a first normalized viewing distance at which the reconstructed video is viewed by a viewer on a viewing device;

computing a second plurality of feature values corresponding to the plurality of visual quality metrics based on the first reconstructed frame, the first source frame, the first display resolution, and a second normalized viewing distance at which the reconstructed video is viewed by a viewer on the viewing device;

executing a trained perceptual quality model on the first plurality of feature values to generate a first perceptual quality score that indicates a first perceived visual quality level for the first reconstructed frame when viewed at the first normalized viewing distance;

executing the trained perceptual quality model on the second plurality of feature values to generate a second perceptual quality score that indicates a second perceived visual quality level for the first reconstructed frame when viewed at the second normalized viewing distance; and performing one or more operations associated with an encoding process based on at least one of the first perceptual quality score or the second perceptual quality score.

2. The computer-implemented method of claim 1, wherein performing the one or more operations associated with the encoding process comprises:

computing an overall perceptual quality score for a first reconstructed video sequence that includes the first reconstructed frame based on the first perceptual quality score, wherein the overall perceptual quality score indicates an overall perceived visual quality level for the first reconstructed video sequence; and computing a tradeoff between quality and bitrate based on the overall perceptual quality score when encoding a first source video sequence.

3. The computer-implemented method of claim 1, wherein performing the one or more operations associated with the encoding process comprises evaluating at least one of an encoder, a decoder, or an adaptive bitrate streaming algorithm based on the first perceptual quality score.

4. The computer-implemented method of claim 1, wherein the first perceived visual quality level approximates the quality of an actual viewing experience where the viewing device has the first display resolution and the viewer views the viewing device at the first normalized viewing distance.

5. The computer-implemented method of claim 1, further comprising:

computing a first pixels-per-degree value based on the first display resolution and the first normalized viewing distance; and computing an absolute perceptual quality score for a first reconstructed video sequence that includes the first reconstructed frame based on the first perceptual quality score and a first offset associated with the first pixels-per-degree value, wherein the absolute perceptual quality score indicates an overall perceived visual quality level for the first reconstructed video sequence.

6. The computer-implemented method of claim 1, wherein the plurality of visual quality metrics comprises at least one of a Detail Loss Metric that is modified to account for different normalized viewing distances and different display resolutions or a Visual Information Fidelity index that is modified to account for different normalized viewing distances.

7. The computer-implemented method of claim 1, wherein computing the first plurality of feature values comprises computing a first feature value by:

computing a pixels-per-degree value based on the first display resolution and the first normalized viewing distance;

computing a plurality of contrast sensitivities based on a plurality of scale indices, the pixels-per-degree value, and at least one contrast sensitivity function; and computing the first feature value based on the first reconstructed frame, the first source frame, and the plurality of contrast sensitivities.

8. The computer-implemented method of claim 1, wherein computing the first plurality of feature values comprises computing a first feature value by:

computing a noise coefficient based on the first normalized viewing distance; and computing the first feature value based on the first reconstructed frame, the first source frame, the first display resolution, the first normalized viewing distance, and the noise coefficient.

9. The computer-implemented method of claim 1, wherein computing the first plurality of feature values comprises computing a first feature value by:

generating a Gaussian two-dimensional kernel based on the first normalized viewing distance; and computing the first feature value based on the Gaussian two-dimensional kernel, the first reconstructed frame, and the first source frame.

10. One or more non-transitory computer readable media including instructions that, when executed by one or more processors, cause the one or more processors to estimate perceived video quality for reconstructed video by performing the steps of:

computing a first plurality of feature values corresponding to a plurality of visual quality metrics based on a first reconstructed frame, a first source frame, a first display resolution, and a first normalized viewing distance at which the reconstructed video is viewed by a viewer on a viewing device;

computing a second plurality of feature values corresponding to the plurality of visual quality metrics based on the first reconstructed frame, the first source frame, the first display resolution, and a second normalized viewing distance at which the reconstructed video is viewed by a viewer on the viewing device;

executing a trained perceptual quality model on the first plurality of feature values to generate a first perceptual quality score that indicates a first perceived visual quality level for the first reconstructed frame when viewed at the first normalized viewing distance;

executing the trained perceptual quality model on the second plurality of feature values to generate a second perceptual quality score that indicates a second perceived visual quality level for the first reconstructed frame when viewed at the second normalized viewing distance; and performing one or more operations associated with an encoding process based on at least one of the first perceptual quality score or the second perceptual quality score.

11. The one or more non-transitory computer readable media of claim 10, wherein performing the one or more operations associated with the encoding process comprises computing a tradeoff between quality and bitrate based on the first perceptual quality score when encoding a first source video sequence that includes the first source frame.

12. The one or more non-transitory computer readable media of claim 10, wherein performing the one or more operations associated with the encoding process comprises:
    computing an overall perceptual quality score for a first reconstructed video sequence that includes the first reconstructed frame based on the first perceptual quality score, wherein the overall perceptual quality score indicates an overall perceived visual quality level for the first reconstructed video sequence; and
    evaluating at least one of an encoder, a decoder, or an adaptive bitrate streaming algorithm based on the overall perceptual quality score.

13. The one or more non-transitory computer readable media of claim 10, wherein the trained perceptual quality model comprises a trained support vector regression model, a trained artificial neural network, or a trained regression tree.

14. The one or more non-transitory computer readable media of claim 10, further comprising:
    computing a first pixels-per-degree value based on the first display resolution and the first normalized viewing distance; and
    computing an absolute perceptual quality score for a first reconstructed video sequence that includes the first reconstructed frame based on the first perceptual quality score and a first offset associated with the first pixels-per-degree value, wherein the absolute perceptual quality score indicates an overall perceived visual quality level for the first reconstructed video sequence.

15. The one or more non-transitory computer readable media of claim 10, wherein the plurality of visual quality metrics comprises at least one of a Detail Loss Metric that is modified to account for different normalized viewing distances and different display resolutions or a Visual Information Fidelity index that is modified to account for different normalized viewing distances.

16. The one or more non-transitory computer readable media of claim 10, wherein computing the first plurality of feature values comprises computing a first feature value by:
    computing a pixels-per-degree value based on the first display resolution and the first normalized viewing distance;
    computing a plurality of contrast sensitivities based on a plurality of scale indices, the pixels-per-degree value, and at least one contrast sensitivity function; and
    computing the first feature value based on the first reconstructed frame, the first source frame, and the plurality of contrast sensitivities.

17. The one or more non-transitory computer readable media of claim 10, wherein computing the first plurality of feature values comprises computing a first feature value by:
    generating a Gaussian two-dimensional kernel based on the first normalized viewing distance; and
    computing the first feature value based on the Gaussian two-dimensional kernel, the first reconstructed frame, and the first source frame.

18. The one or more non-transitory computer readable media of claim 10, wherein the first reconstructed frame is in a High Dynamic Range format.

19. A system comprising:
    one or more memories storing instructions; and
    one or more processors coupled to the one or more memories that, when executing the instructions, perform the steps of:
        computing a first plurality of feature values corresponding to a plurality of visual quality metrics based on a first reconstructed frame, a first source frame, a first display resolution, and a first normalized viewing distance at which the reconstructed video is viewed by a viewer on a viewing device;
        computing a second plurality of feature values corresponding to the plurality of visual quality metrics based on the first reconstructed frame, the first source frame, the first display resolution, and a second normalized viewing distance at which the reconstructed video is viewed by a viewer on the viewing device;
        executing a trained perceptual quality model on the first plurality of feature values to generate a first perceptual quality score that indicates a first perceived visual quality level for the first reconstructed frame when viewed at the first normalized viewing distance;
        executing the trained perceptual quality model on the second plurality of feature values to generate a second perceptual quality score that indicates a second perceived visual quality level for the first reconstructed frame when viewed at the second normalized viewing distance; and
        performing one or more operations associated with an encoding process based on at least one of the first perceptual quality score or the second perceptual quality score.

* * * * *